US008736589B2

(12) United States Patent
Lee et al.
(10) Patent No.: US 8,736,589 B2
(45) Date of Patent: May 27, 2014

(54) DISPLAY DEVICE AND DRIVING METHOD THEREOF

(75) Inventors: Baek-Woon Lee, Yongin-si (KR); Seong-Il Park, Seoul (KR); Kyong-Tae Park, Suwon-si (KR)

(73) Assignee: Samsung Display Co., Ltd. (KR)

(*) Notice: Subject to any disclaimer, the term of this patent is extended or adjusted under 35 U.S.C. 154(b) by 0 days.

(21) Appl. No.: 13/619,914

(22) Filed: Sep. 14, 2012

(65) Prior Publication Data

US 2013/0009942 A1 Jan. 10, 2013

Related U.S. Application Data

(62) Division of application No. 12/545,615, filed on Aug. 21, 2009, now Pat. No. 8,289,313.

(30) Foreign Application Priority Data

Dec. 29, 2008 (KR) ........................ 10-2008-0135661

(51) Int. Cl.
*G06F 3/041* (2006.01)

(52) U.S. Cl.
USPC ................ 345/204; 345/211; 345/76; 345/77

(58) Field of Classification Search
None
See application file for complete search history.

(56) References Cited

U.S. PATENT DOCUMENTS

| | | | | |
|---|---|---|---|---|
| 6,924,602 | B2 * | 8/2005 | Komiya | 315/169.3 |
| 6,977,470 | B2 | 12/2005 | Tseng | |
| 7,459,859 | B2 | 12/2008 | Tseng et al. | |
| 8,049,701 | B2 | 11/2011 | Kim | |
| 2006/0066254 | A1 * | 3/2006 | Sasaki et al. | 315/169.3 |
| 2006/0132399 | A1 * | 6/2006 | Miyazawa | 345/76 |
| 2009/0309516 | A1 | 12/2009 | Kim | |
| 2010/0013816 | A1 * | 1/2010 | Kwak | 345/211 |
| 2010/0141644 | A1 | 6/2010 | Lee et al. | |
| 2010/0164847 | A1 | 7/2010 | Lee et al. | |
| 2010/0194716 | A1 * | 8/2010 | Park | 345/204 |

FOREIGN PATENT DOCUMENTS

| | | |
|---|---|---|
| JP | 2003-295822 | 10/2003 |
| JP | 2004-361737 | 12/2004 |
| JP | 2005-134838 | 5/2005 |
| JP | 2006-106141 | 4/2006 |
| JP | 2008-046320 | 2/2008 |
| KR | 10-2006-0114456 | 11/2006 |
| KR | 10-0675939 | 1/2007 |
| KR | 10-2007-0019463 | 2/2007 |
| KR | 10-2008-0054764 | 6/2008 |

* cited by examiner

*Primary Examiner* — Van Chow
(74) *Attorney, Agent, or Firm* — Innovation Counsel LLP

(57) ABSTRACT

In a display device, the anode voltage of an organic light emitting element is periodically reset. The control terminal of a driving transistor is periodically reset, and an input data voltage is connected to the control terminal through an input terminal and an output terminal of the driving transistor. As a result, good control over the displayed luminance is achieved. Other features are also provided.

19 Claims, 28 Drawing Sheets

DISPLAY DEVICE AND DRIVING METHOD THEREOF

CROSS-REFERENCE TO RELATED APPLICATION

This application is a divisional of U.S. patent application Ser. No. 12/545,615 filed on Aug. 21, 2009, which claims priority to and the benefit of Korean Patent Application No. 10-2008-0135661 filed in the Korean Intellectual Property Office on Dec. 29, 2008. The entire contents of each application are incorporated herein by reference.

BACKGROUND OF THE INVENTION (a) Field of the Invention

The present invention relates to a display device and a driving method thereof, and more particularly to an organic light emitting device and a driving method thereof.

(b) Description of the Related Art

A hold type flat panel display such as an organic light emitting device displays fixed images for a predetermined time, for example one frame at a time, irrespective of whether or not the images are still images or part of a motion picture. In case of a motion picture, when displaying a moving object, the object is displayed in consecutive frames at discrete consecutive positions in the motion path. Since the frames quickly follow one another, the object's motion appears continuous.

However, when a user views the moving object on the screen, the user's eyes move continuously along the anticipated path of the object. Consequently, the object appears blurred due to the mismatch between the continuous motion of the user's eyes and the discrete motion of the object on the screen. For example, assuming that the object is displayed at a position A in the first frame and at a position B in the second frame, the user's eyes move during the first frame along the object's expected motion path from position A to position B. However, the object is not actually displayed at their intermediate positions between A and B. As a result, the object appears blurred since the image sensed by the user during the first frame is acquired by the user via integrating the luminance of the pixels in the path from the position A to the position B, that is, by averaging the luminance of the object and the luminance of the background.

The degree of blurring in a hold type display device is proportional to the time that the object is displayed in a fixed position. Therefore, an impulse drive method has been proposed according to which the fixed image is displayed for a predetermined time within one frame and black is displayed for the rest of the frame. However, this method decreases the luminance of the image due to the reduced time of image display. Therefore, it has been proposed to increase the image luminance while the image is displayed. Alternatively, instead of displaying black, it has been proposed to display an intermediate luminance between the current frame and a neighboring frame. However, these techniques increase power consumption and drive complexity.

A pixel of an organic light emitting device includes an organic light emitting element and a thin film transistor (TFT) for driving the organic light emitting element. Disadvantageously, the TFT threshold voltage changes with time to impede generation of the desired luminance. Also, if the semiconductor material providing the active areas for the TFTs of different pixels does not have uniform properties across the display device, the luminance output is not uniform across the pixels.

Also, when the voltage at the anode of the organic light emitting element uncontrollably changes, the current flowing to the organic light emitting element may uncontrollably change to undesirably affect the displayed luminance.

The above information disclosed in this Background section is only for enhancement of understanding of the background of the invention and therefore it may contain information that does not form the prior art known in this country to a person of ordinary skill in the art.

SUMMARY

Some embodiments of the present invention provide an organic light emitting device with controllable luminance.

Some embodiments of the present invention provide a display device comprising one or more pixels, each pixel being associated with a first signal, a second signal, a third signal, and a fourth signal, each pixel comprising: (a) a light-emitting device; (b) a driving transistor for outputting a current to the light-emitting device, the driving transistor comprising an input terminal, an output terminal, and a control terminal; (c) a data voltage terminal for receiving data voltages; (d) a plurality of switching transistors comprising: (1) a switching transistor controlled by the associated first signal, and connected between the data voltage and the input terminal of the driving transistor; (2) a switching transistor controlled by the associated second signal, and connected between a driving voltage terminal and the input terminal of the driving transistor; (3) a switching transistor controlled by the associated third signal, and connected between an output terminal of the driving transistor and a first terminal of the light-emitting device; (4) a switching transistor controlled by the associated fourth signal, and connected between the output terminal of the driving transistor and the control terminal of the driving transistor; wherein each pixel further comprises a first capacitor connected between the control terminal of the driving transistor and the driving voltage terminal; wherein the display device further comprises a control circuit for generating control signals which include the first, second, third and fourth signals associated with the one or more pixels, the control signals being generated for one or more consecutive first periods of time and acting to reset a voltage at the first terminal of the light-emitting device in each first period of time.

In some embodiments, the one or more pixels comprise a plurality of rows of pixels; the pixels in each row share an associated plurality of the control signals, the associated plurality being associated with the row and comprising a single first signal, a single second signal, a single third signal, and a single fourth signal.

In some embodiments, the first terminal of the light-emitting device is an anode, and each first period is a frame.

In some embodiments, the control circuit is for generating the control signals for each pixel so that: each pixel is associated with consecutive first, second, third and fourth intervals of time; and during at least part of the first interval, the switching transistors in (1) and (2) are turned off and the switching transistors in (3) and (4) are turned on, during at least part of the second interval, the switching transistors in (1) and (4) are turned on and the switching transistors in (2) and (3) are turned off, during at least part of the third interval, the switching transistor (1) is turned on and the switching transistors (2), (3), and (4) are turned off, and during at least part of the fourth interval, the switching transistors (1) and (4) are turned off and the switching transistors (2) and (3) are turned on.

In some embodiments, the control circuit is for generating the control signals so that, in each pixel: the light-emitting device stops emitting light during the first, second, and third intervals, and the light-emitting device emits light during the fourth interval.

In some embodiments, the control circuit is for generating the control signals so that, in each pixel: an interval in which the light-emitting device emits light is controlled by the second signal.

In some embodiments, the control circuit is for generating the control signals so that, in each pixel: the voltage at the first terminal of the light-emitting device is reset during the first interval.

In some embodiments, in each pixel, the switching transistors (1), (2), (3), (4), and the driving transistor are p-channel electric field effect transistors.

In some embodiments, each pixel is associated with a fifth signal which is one of the control signals, and wherein in each pixel, the plurality of switching transistors further comprises: (5) a switching transistor connected between a reset voltage terminal and the switching transistor (3) and controlled by the associated fifth signal.

In some embodiments, the control circuit is for generating the control signals for each pixel so that: each pixel is associated with consecutive first, second, third and fourth intervals of time and with a fifth interval of time which precedes the first interval of time; and during at least part of the first interval, the switching transistors (1) and (2) are turned off and the switching transistors (3) and (4) are turned on, during at least part of the second interval, the switching transistors (1) and (4) are turned on and the switching transistors (2) and (3) are turned off, during at least part of the third interval, the switching transistor (1) is turned on and the switching transistors (2), (3), and (4) are turned off, during at least part of the fourth interval, the switching transistors (1) and (4) are turned off and the switching transistors (2) and (3) are turned on, and during at least part of the fifth interval, the switching transistors (1), (2), and (4) are turned off and the switching transistor (3) is turned on.

In some embodiments, the control circuit is for generating the control signals for each pixel so that: the switching transistor (5) is turned on during at least part of the first interval and at least part of the fifth interval, and is turned off during at least part of the second interval, at least part of the third interval, and at least part of the fourth interval.

In some embodiments, in each pixel, the switching transistor (5) is connected between the switching transistor (3) and the first terminal of the light-emitting device.

In some embodiments, in each pixel, the switching transistor (5) is connected between the switching transistor (3) and the first terminal of the light-emitting device.

In some embodiments, the control circuit is for generating the control signals so that, in each pixel: the light-emitting device stops emitting light during the first, second, and third intervals, and the light-emitting device emits light during the fourth interval.

In some embodiments, the control circuit is for generating the control signals so that, in each pixel: an interval in which the light-emitting device emits light is controlled by the second signal.

In some embodiments, the control circuit is for generating the control signals so that, in each pixel: the voltage at the first terminal of the light-emitting device is reset during the first interval and the fifth interval.

In some embodiments, in each pixel, the switching transistors (1), (2), (3), (4), and (5) and the driving transistor are p-channel electric field effect transistors.

In some embodiments, in each pixel, the switching transistors (1), (2), (3), and (4) and the driving transistor are p-channel electric field effect transistors, and the switching transistor (5) is an n-channel electric field effect transistor.

In some embodiments, in each pixel, the switching transistors (2) and (3) and the driving transistor are p-channel electric field effect transistors, and the switching transistors (1), (4), and (5) are n-channel electric field effect transistors.

In some embodiments, each pixel is associated with a sixth signal which is one of the control signals, and wherein in each pixel, the plurality of switching transistors further comprises: (6) a switching transistor connected to the control terminal of the driving transistor and to a terminal for receiving a sustain voltage, the switching transistor (6) being controlled by the associated sixth signal; wherein each pixel further comprises a second capacitor connected between the control terminal of the driving transistor and a control terminal of the first switching transistor, and wherein for each pixel, the associated second signal coincides with the associated third signal, and the associated fifth signal coincides with the associated sixth signal.

In some embodiments, the control circuit is for generating the control signals for each pixel so that: each pixel is associated with consecutive first, second, third and fourth intervals of time; and during at least part of the first interval, the switching transistors (1), (2), (3), and (4) are turned off and the switching transistors (5) and (6) are turned on, during at least part of the second interval, the switching transistors (1) and (4) are turned on and the switching transistors (2), (3), (5), and (6) are turned off, during at least part of the third interval, the switching transistors (1) to (6) are turned off, and during at least part of the fourth interval, the switching transistors (1), (4), (5), and (6) are turned off and the switching transistors (2) and (3) are turned on.

In some embodiments, the control circuit is for generating the control signals so that, in each pixel: the voltage at the first terminal of the light-emitting device is reset during the first interval.

In some embodiments, each pixel is associated with a sixth signal which is one of the control signals, and wherein in each pixel, the plurality of switching transistors further comprises: (6) a switching transistor connected to the control terminal of the driving transistor and to a terminal for receiving a sustain voltage, the switching transistor (6) being controlled by the associated sixth signal; wherein each pixel further comprises a second capacitor connected between the control terminal of the driving transistor and a control terminal of the first switching transistor, and wherein for each pixel, the associated second, third, and fifth signals are the same signal.

In some embodiments, the control circuit is for generating the control signals for each pixel so that: each pixel is associated with consecutive first, second, third and fourth intervals of time; and during at least part of the first interval, the switching transistors (1), (2), (3), and (4) are turned off and the switching transistors (5) and (6) are turned on, during at least part of the second interval, the switching transistors (1), (4), and (5) are turned on and the switching transistors (2), (3), and (6) are turned off, during at least part of the third interval, the switching transistors (1), (2), (3), (4), and (6) are turned off and the switching transistor (5) is turned on, and during at least part of the fourth interval, the switching transistors (1), (4), (5), and (6) are turned off and the switching transistors (2) and (3) are turned on.

Some embodiments of the present invention provide a method for driving a display device including an organic light emitting element and a driving transistor, the method comprising: resetting a voltage at a control terminal of the driving transistor; resetting a voltage at a first terminal of the organic light emitting element, the first terminal being at a variable voltage during operation; connecting a data voltage to the control terminal of the driving transistor to charge the control terminal to a first voltage depending on the data voltage; and emitting, by the organic light emitting element, light corresponding to the first voltage at the control terminal.

In some embodiments, the method further comprises displaying black by the organic light emitting element irrespective of the data voltage.

In some embodiments, connecting the data voltage to the control terminal of the driving transistor comprises connecting the data voltage to an input terminal of the driving transistor and to an output terminal of the driving transistor.

In some embodiments, the display device further includes a switching transistor for providing a data voltage to an input terminal of the driving transistor in response to a scanning signal, a driving voltage transistor connected between a driving voltage terminal and the input terminal of the driving transistor, a light-emitting device transistor connected between the first terminal of the organic light emitting element and an output terminal of the driving transistor, and a compensation transistor connected between the output and control terminals of the driving transistor, and the resetting of the voltage at the control terminal and the resetting of the voltage at the first terminal of the organic light emitting element are performed simultaneously.

In some embodiments, the resetting of the voltage at the control terminal and the resetting of the voltage at the first terminal of the organic light emitting element are performed by turning on the compensation transistor and the light-emitting device transistor.

In some embodiments, the connecting of the data voltage to the control terminal of the driving transistor is performed by turning on the switching transistor and the compensation transistor when the control terminal is reset.

In some embodiments, the emitting of light by the organic light emitting element is performed by turning on the driving voltage transistor and the light-emitting device transistor.

In some embodiments, the switching transistor and the compensation transistor are turned on for about two horizontal periods in each frame.

In some embodiments, the light-emitting device transistor is turned off for about two horizontal periods in each frame.

In some embodiments, the display device further includes a switching transistor for providing the data voltage to an input terminal of the driving transistor in response to a scanning signal, a driving voltage transistor connected between a driving voltage terminal and the input terminal of the driving transistor, a light-emitting device transistor connected between the first terminal of the organic light emitting element and an output terminal of the driving transistor, a compensation transistor connected between the output and control terminals of the driving transistor, and a reset transistor for resetting the voltage at the first terminal of the organic light emitting element, and the resetting of the voltage at the first terminal of the organic light emitting element is performed by turning on the reset transistor.

In some embodiments, the resetting of the control terminal is performed by turning on the compensation transistor, the reset transistor, and the light-emitting device transistor.

In some embodiments, the connecting of the data voltage to the control terminal of the driving transistor is performed by turning on the switching transistor and the compensation transistor when the control terminal is reset.

In some embodiments, the emitting of light by the organic light emitting element is performed by turning on the driving voltage transistor and the light-emitting device transistor.

In some embodiments, the switching transistor, the compensation transistor, and the reset transistor are turned on for about two horizontal periods in each frame.

In some embodiments, the light-emitting device transistor is turned off for about two horizontal periods in each frame.

In some embodiments, the display device further includes a switching transistor for providing the data voltage to an input terminal of the driving transistor in response to a scanning signal, a driving voltage transistor connected between the driving voltage terminal and the input terminal of the driving transistor, a light-emitting device transistor connected between the first terminal of the organic light emitting element and an output terminal of the driving transistor, a compensation transistor connected between the output and control terminals of the driving transistor, a first reset transistor for resetting the voltage at the first terminal of the organic light emitting element, and a second reset transistor connected to the control terminal of the driving transistor, and the resetting of the voltage at the first terminal of the organic light emitting element is performed by turning on the first reset transistor.

In some embodiments, the resetting of the control terminal is performed by turning on the second reset transistor.

In some embodiments, the resetting of the voltage at the first terminal of the organic light emitting element and the resetting of the control terminal are performed simultaneously.

In some embodiments, the connecting of the data voltage to the control terminal of the driving transistor is performed by turning on the switching transistor and the compensation transistor when the control terminal is reset.

In some embodiments, the emitting of light by the organic light emitting element is performed by turning on the driving voltage transistor and the light-emitting device transistor.

Some embodiments of the present invention provide impulse driving with controllable anode voltage, and controllable luminance is displayed which represents the input data voltage in the organic light emitting device.

DETAILED DESCRIPTION OF SOME EMBODIMENTS

Exemplary embodiments of the present invention will now be described with reference to the accompanying drawings. These embodiments do not limit the present invention except as defined by the appended claims.

Figure 1:
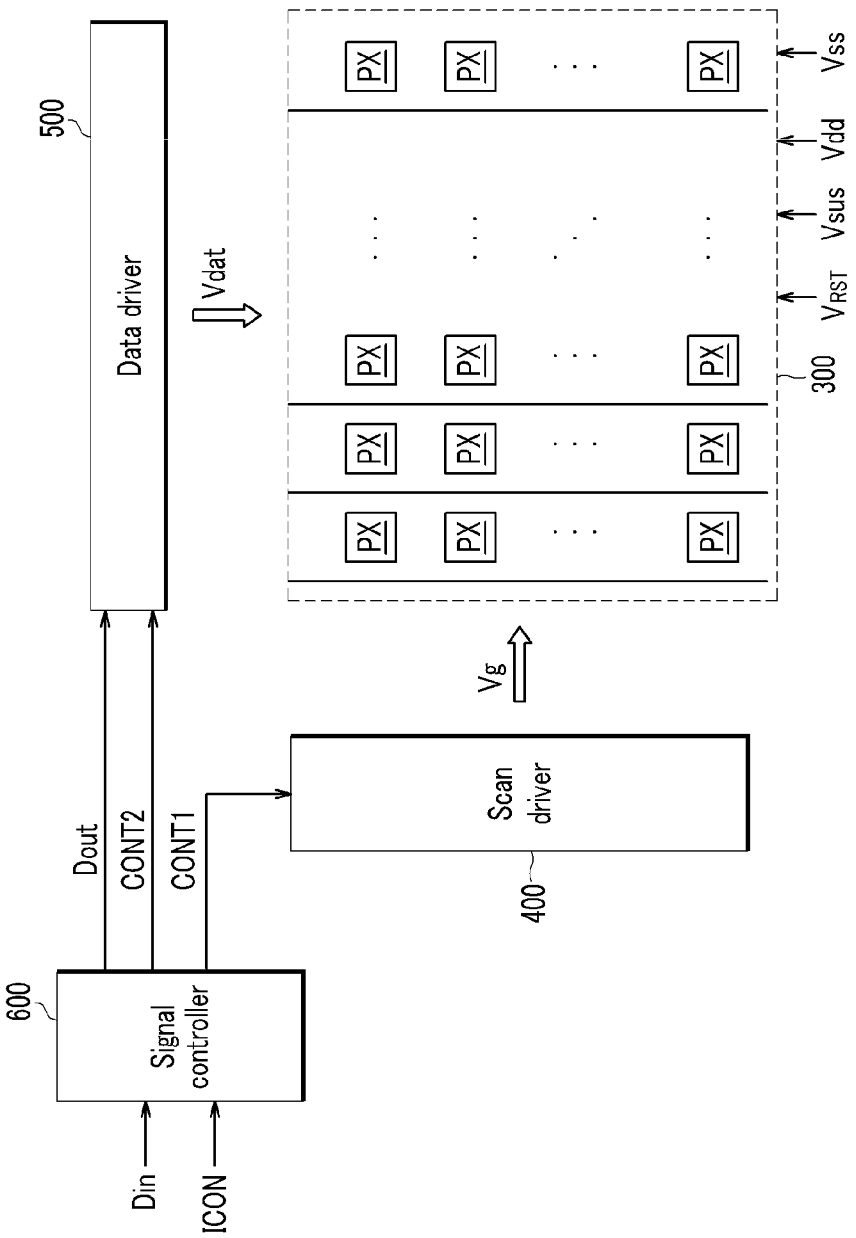
FIG. 1 shows a block diagram of an organic light emitting device according to an exemplary embodiment of the present invention.
Figure 2:
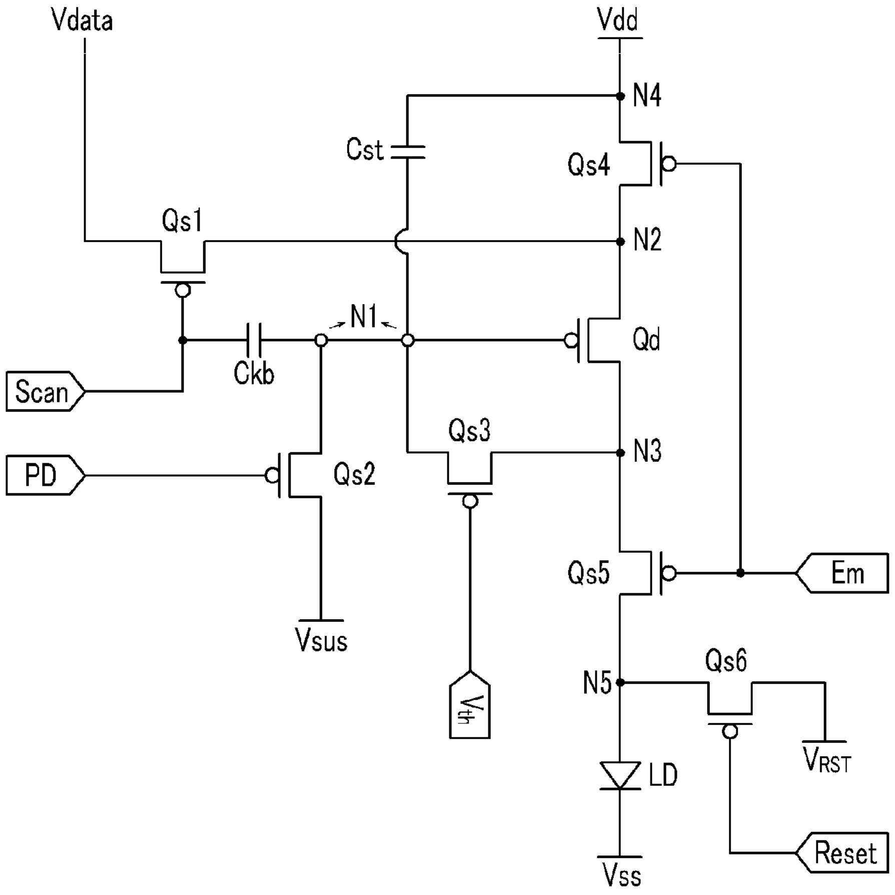
FIG. 2 shows a circuit diagram of a pixel in an organic light emitting device according to an exemplary embodiment of the present invention.

An organic light emitting device according to an exemplary embodiment of the present invention will now be described with reference to FIG. 1 and FIG. 2. FIG. 1 shows a block diagram of the organic light emitting device, and FIG. 2 shows a circuit diagram of a pixel of the organic light emitting device. The remaining pixels can be identical to the pixel of FIG. 2.

Referring to FIG. 1, the organic light emitting device includes a display panel 300, a scan driver 400, a data driver 500, and a signal controller 600.

The display panel 300 includes a plurality of signal lines (not shown), a plurality of voltage lines (not shown), and a plurality of pixels PX connected thereto and arranged substantially in a matrix.

Figure 3:
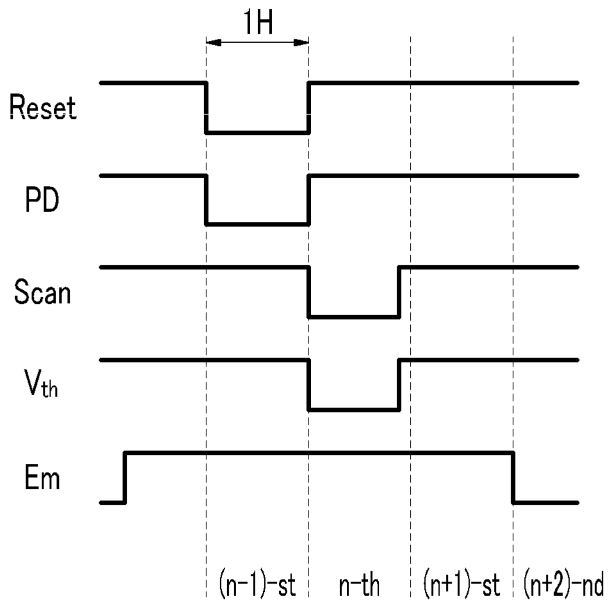
FIG. 3 shows waveform diagrams of driving signals applied to one row of pixels in an organic light emitting device of FIG. 2.

The signal lines include a plurality of scanning signal lines for transmitting scanning signals, a plurality of compensation signal lines for transmitting compensation signals, and a plurality of data lines for transmitting data signals. The scanning signal lines and the compensation signal lines extend in the row direction and are substantially parallel to each other, and the data lines extend in the column direction and are substantially parallel to each other. Each scanning signal line is connected to a corresponding row of pixels PX at the pixels' input terminals "Scan" (FIG. 2). Each data line is connected to a corresponding column of pixels PX at the pixels' input terminals "Vdata" (FIG. 2). For each row, a number of compensation signal lines can be provided and connected to the row's pixels PX. In some embodiments, one of these compensation signal lines is connected to the pixel terminals Reset (FIG. 2), another one of the compensation signal lines is connected to the pixel terminals PD, another one of the compensation signal lines is connected to the pixel terminals Vth, and another one of the compensation signal lines is connected to the pixel terminals Em. These terminals are named using the same names as the respective signals. Some lines can be combined into a single line as illustrated in the timing diagrams of FIG. 3 discussed in more detail below. For example, FIG. 3 shows that the signals Reset and PD have the same timing, and hence the corresponding compensation signal lines can be merged into one line.

The voltage lines include lines that provide constant voltages to the pixels. The constant voltages include a driving voltage Vdd (FIG. 2), which is a power supply voltage and is provided by a driving voltage line, a voltage Vss, a reset voltage VRST, and a sustain voltage Vsus. These voltages are described below.

As shown in FIG. 2, each pixel PX includes an organic light emitting element LD, a driving transistor Qd, capacitors Cst and Ckb, and six switching transistors Qs1-Qs6.

The driving transistor Qd has an output terminal, an input terminal, and a control terminal. The control terminal of the driving transistor Qd is connected at a node N1 to the capacitors Cst and Ckb, and is also connected to an input terminal of a second switching transistor Qs2 and an output terminal of a third switching transistor Qs3 ("compensation transistor"). The input terminal of the driving transistor Qd is connected at a node N2 to an output terminal of a first switching transistor Qs1 and an output terminal of a fourth switching transistor Qs4. The output terminal of the driving transistor Qd is connected at a node N3 to an input terminal of the third switching transistor Qs3 and an input terminal of a fifth switching transistor Qs5.

A first terminal of the capacitor Cst is connected at the node N1 to the driving transistor Qd and second and third switching transistors Qs2 and Qs3, and a second terminal of the capacitor Cst is connected at a node N4 to the driving voltage Vdd and an input terminal of the fourth switching transistor Qs4. Also, a first terminal of the capacitor Ckb is connected at the node N1 to the driving transistor Qd and the second and third switching transistors Qs2 and Qs3, and a second terminal of the capacitor Ckb is connected to the corresponding scanning signal line and a control terminal of the first switching transistor Qs1.

The switching transistors Qs1-Qs6 include the first switching transistor Qs1 for transmitting a data voltage, the second switching transistor Qs2 for resetting the voltage at the control terminal of the driving transistor Qd, the third switching transistor Qs3 for controlling the voltage at the control terminal of the driving transistor Qd to compensate for variations of the threshold voltage of the driving transistor Qd, the fourth switching transistor Qs4 for applying the driving voltage Vdd to the driving transistor Qd, the fifth switching transistor Qs5 for applying the output signal of the driving transistor Qd to the organic light emitting element LD, and a sixth switching transistor Qs6 for resetting the anode voltage of the organic light emitting element LD.

The first switching transistor Qs1 transmits the data voltage Vdata to the input terminal of the driving transistor Qd in response to the scanning signal Scan. The second switching transistor Qs2 connects the sustain voltage Vsus to the node N1 in response to the control signal PD, and thus discharges the node N1 to the sustain voltage Vsus if the node N1 is above the sustain voltage. The third switching transistor Qs3 provides a conductive path between the nodes N1 and N3 in response to the control signal Vth, and thus connects the voltage at the node N3 to the node N1. The fourth switching transistor Qs4 and the fifth switching transistor Qs5 are controlled by the control signal Em. The fourth switching transistor Qs4 transmits the driving voltage Vdd to the driving transistor Qd, and the fifth switching transistor Qs5 transmits the output current of the driving transistor Qd to the organic light emitting element LD. The sixth switching transistor Qs6 applies the reset voltage VRST to the node N5 in response to the control signal Reset.

In the present exemplary embodiment, the switching transistors Qs1 to Qs6 and the driving transistor Qd are p-channel electric field effect transistors (PMOS). These may for example be thin film transistors (TFT), and they may include polysilicon or amorphous silicon.

The organic light emitting element LD has an anode connected to the fifth and sixth switching transistors Qs5 and Qs6, and has a cathode connected to the common voltage Vss. The organic light emitting element LD displays images by emitting light of varying intensity which depends on the current ILD supplied by the driving transistor Qd through the fifth switching transistor Qs5, and the current ILD through the driving transistor Qd depends on the voltage between the control terminal and the input terminal of the driving transistor Qd. The sixth switching transistor Qs6 resets the anode voltage to the reset voltage VRST. The anode voltage becomes more controllable as a result.

Referring to FIG. 1 again, the scan driver 400 is connected to the scanning signal lines and the compensation signal lines of the display panel 300, and it applies scanning signals Scan and compensation signals Reset, PD, Vth, Em. Each of these signals alternates between a high voltage Vhigh and a low voltage Vlow. The operating voltages (including Vdata, VRST, VDD, VSS, Vsus, and other voltages) are such that each of the switching transistors Qs1 to Qs6 is turned off by the high voltage Vhigh on the transistor's control terminal, and is turned on by the low voltage Vlow on the transistor's control terminal. The sustain voltage Vsus is a low voltage. When it is provided to the node N1 through the second switching transistor Qs2, the sustain voltage Vsus turns on the driving transistor Qd. The reset voltage VRST resets the anode voltage of the organic light emitting element LD. The sustain voltage Vsus, the reset voltage VRST, and the driving voltage Vdd can be applied through driving voltage lines.

The data driver 500 is connected to the data lines of the display panel 300 to drive the data voltages Vdata to the data lines. The data voltages Vdata are generated from the image signal defining the image to be displayed.

The signal controller 600 controls the scan driver 400 and the data driver 500 to control light emission by the pixels PX.

The drivers 400, 500, and 600 can be directly installed on the display panel 300 as at least one IC (integrated circuit) chip, they can be installed on a flexible printed circuit film (not shown) and can then be attached to the display panel 300 in a tape carrier package (TCP), or they can be installed on an additional printed circuit board (PCB) (not shown). Alternatively, the drivers 400, 500, and 600 can be integrated on the display panel 300 together with the signal lines and the transistors Qs1-Qs6 and Qd. Further, the drivers 400, 500, and 600 can be integrated in a single chip or multiple chips or be provided as a combination of integrated circuits and discrete elements.

The operation of the organic light emitting device will now be described with reference to FIG. 3 to FIG. 7. FIG. 3 shows waveform diagrams (timing diagrams) of driving signals applied to an exemplary, n-th row of pixels in the organic light emitting device. FIG. 4 to FIG. 7 show equivalent circuit diagrams of an exemplary pixel in that the n-th row in different time intervals (horizontal periods) marked at the bottom of FIG. 3.

The signal controller 600 receives an input image signal Din and an input control signal ICON which controls the display of the image defined by the image signal Din. The two signals are received from an external graphics controller (not shown). The input image signal Din has luminance information for each pixel PX. The luminance of each pixel PX can have any one of a predetermined number of gray levels. The number of gray levels can be $1024=2^{10}$, $256=2^{8}$, $64=2^{6}$, or some other number. The input control signal ICON may include, for example, a vertical synchronization signal, a horizontal synchronizing signal, a main clock signal, and a data enable signal.

The signal controller 600 processes the input image signal Din as needed for the display panel 300 in accordance with the input control signal ICON, and generates a scan control signal CONT1 and a data control signal CONT2. The signal controller 600 transmits the scan control signal CONT1 to the scan driver 400, and transmits the data control signal CONT2 and the output image signal Dout to the data driver 500.

The scan control signal CONT1 may include a scanning start signal (STV) for signaling the start of driving the high voltage Vhigh on one of the scanning signal lines and on the compensation signal lines for the same row, may include at least one clock signal for specifying an output period in which the high voltage Vhigh is driven on any given scanning line, and an output enable signal (OE) for controlling the duration of the high voltage Vhigh.

The data control signal CONT2 includes a horizontal synchronization start signal for indicating the start of transmitting a digital image signal Dout defining the analog data voltages Vdata for a corresponding row of pixels PX, a load signal for applying the analog data voltages Vdata to the respective data lines, and a data clock signal HCLK.

Under the control of the scan control signal CONT1 provided by the signal controller 600, the scan driver 400 drives consecutive rows of pixels PX, row after row, with the same set of waveform patterns for the scanning signal line and the compensation signal lines. Each waveform pattern includes an alternating pattern of the high voltage Vhigh and the low voltage Vlow. The pattern for each row is shifted in time by a fixed amount relative to the previous row.

Under the control of the data control signal CONT2 provided by the signal controller 600, the data driver 500 receives the digital output image signal Dout for the pixels PX of each row, converts the output image signal Dout into the analog data voltages Vdata, and applies the analog data voltages Vdata to the respective data lines. The data driver 500 outputs the data voltages Vdata for the pixels PX of one row during one horizontal period 1H. In the example of FIG. 3, the data voltages Vdata for an exemplary, n-th row are output in an n-th horizontal period 1H in which the corresponding Scan signal is at the low voltage level Vlow.

The voltages in the n-th pixel row will now be described. All the rows are driven in the same manner.

FIG. 3 shows signals for the n-th row of pixels. In the (n−1)-th horizontal period, the control signals Reset and PD for the n-th row are at a turn-on voltage, and the scanning signal Scan is at a turn-off voltage. Since the transistors of FIG. 2 are p-channel electric field effect transistors, the turn-on voltage is the low voltage Vlow, and the turn-off voltage is the high voltage Vhigh. In the n-th horizontal period, the Reset and PD signals are at the turn-off voltage, and the scanning signal (Scan) and the Vth control signal are at the turn-on voltage. After the n-th horizontal period, the Reset, PD, Scan, and Vth signals are at the turn-off voltage. The Em control signal is at the turn-off voltage in the (n+1)-th horizontal period, and becomes the turn-on voltage some time later, starting in the (n+2)-th horizontal period in the example of FIG. 3. While the Em control signal is at the turn-on voltage, the organic light emitting element LD emits light. The Em control signal changes to the turn-off voltage before the (n−1)-th horizontal period of the next frame. The duration of the Em control signal being at the turn-off voltage may vary depending on the embodiment.

The states of an exemplary pixel PX in the n-th row in different horizontal periods will now be described.

Figure 4:
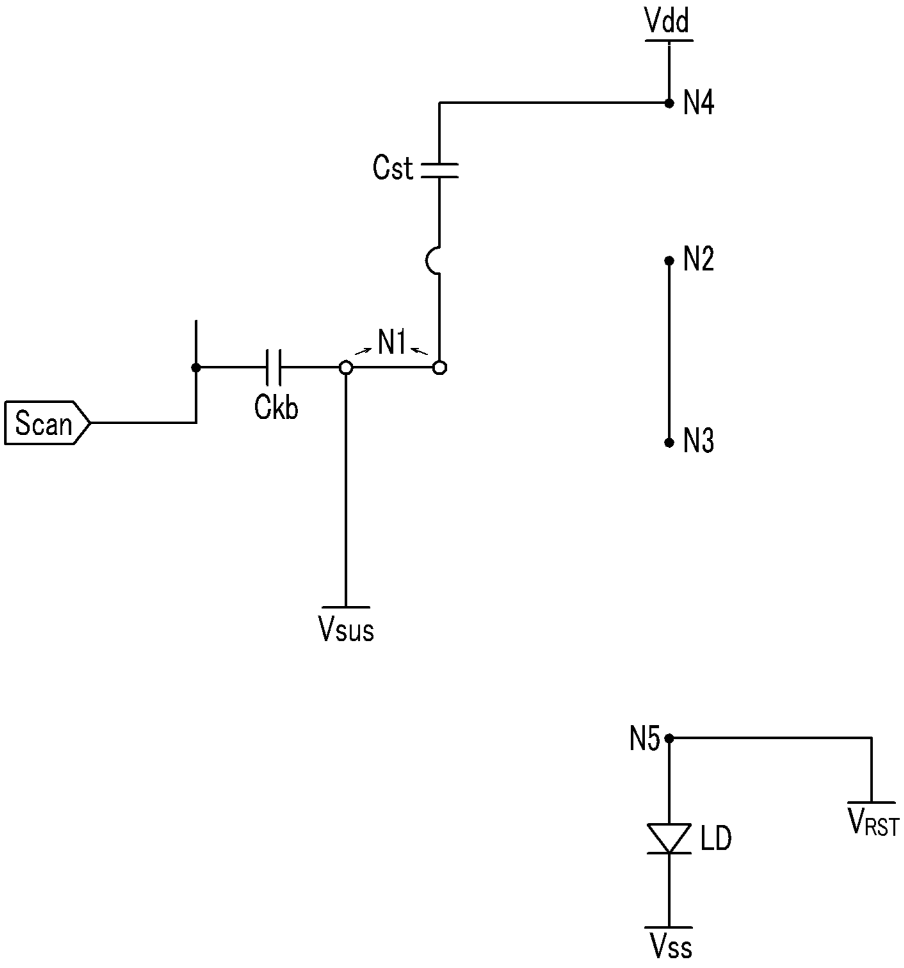
FIG. 4 to FIG. 7 show equivalent circuit diagrams of a pixel in different horizontal periods marked in FIG. 3.

In the (n−1)-th interval, the scan driver 400 switches the Reset and PD control signals from the turn-off voltage to the turn-on voltage according to the scan control signal CONT1 provided by the signal controller 600. As a result, the sixth switching transistor Qs6 and the second switching transistor Qs2 turn on. Therefore, the sixth switching transistor Qs6 resets the anode of the organic light emitting element LD to the reset voltage VRST, and the second switching transistor Qs2 resets the node N1 to the sustain voltage Vsus. The sustain voltage Vsus at the node N1 turns on the driving transistor Qd. The resulting state of the pixel (the equivalent circuit diagram) is shown in FIG. 4.

Figure 5:
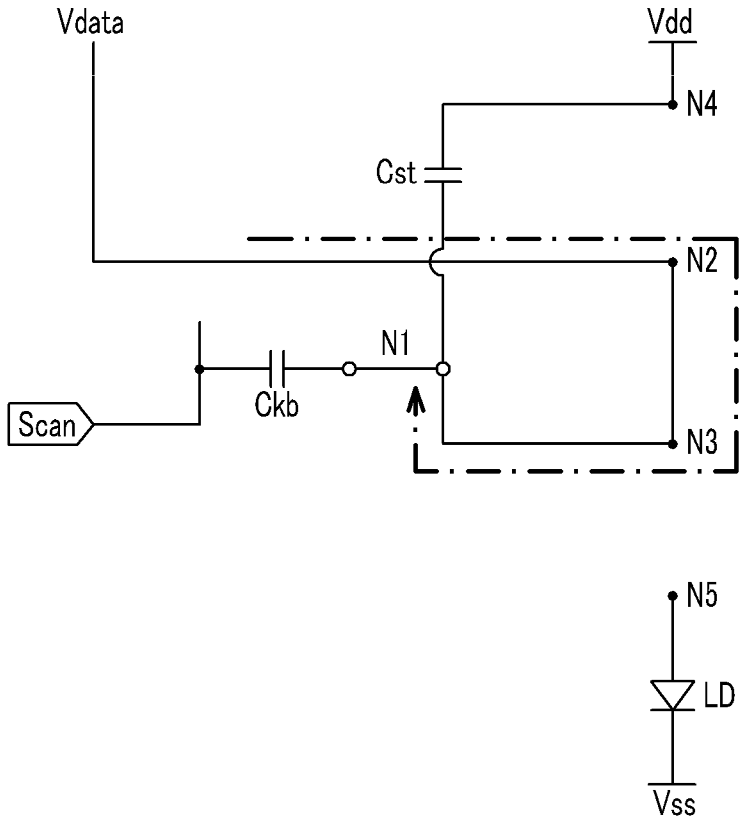

In the n-th horizontal period, the scan driver 400 changes the Reset and PD control signals from the turn-on voltage to the turn-off voltage according to the scan control signal CONT1 provided by the signal controller 600, and changes the scanning signal Scan and the Vth control signal from the turn-off voltage to the turn-on voltage. The second and sixth switching transistors Qs2 and Qs6 are turned off, and the first switching transistor Qs1 receiving the scanning signal Scan is turned on to connect the data voltage Vdata to the input terminal (N2 node) of the driving transistor Qd. Also, the third switching transistor Qs3 receiving the Vth control signal is turned on to provide a conductive path between the nodes N1 and N3. Since the node N1 was reset to the sustain voltage Vsus and the driving transistor Qd is on, the voltage difference between the data voltage Vdata at the node N2 and the sustain voltage Vsus at the node N1 causes current to flow from the node N2 through the node N3 to the node N1. The node N1 accumulates charge stored in the capacitors Cst and Ckb. Of the two capacitors Cst and Vmain, the capacitor Cst performs the main function, and the capacitor Ckb performs the auxiliary function. The node N1 is charged to the sum Vdata+Vth of the data voltage Vdata and the threshold voltage Vth of the driving transistor Qd (the threshold voltage Vth is not to be confused with the Vth control signal at the control terminal of the compensation transistor Qs3). The third switching transistor Qs3 may or may not have the same threshold voltage Vth as the driving transistor Qd. In some embodiments, the voltage Vsus is chosen not to exceed Vdata+Vth for any possible Vdata voltage. When the node N1 reaches the voltage Vdata+Vth, the driving transistor Qd turns off. The circuit state in the n-th horizontal period is shown in FIG. 5.

Figure 6:
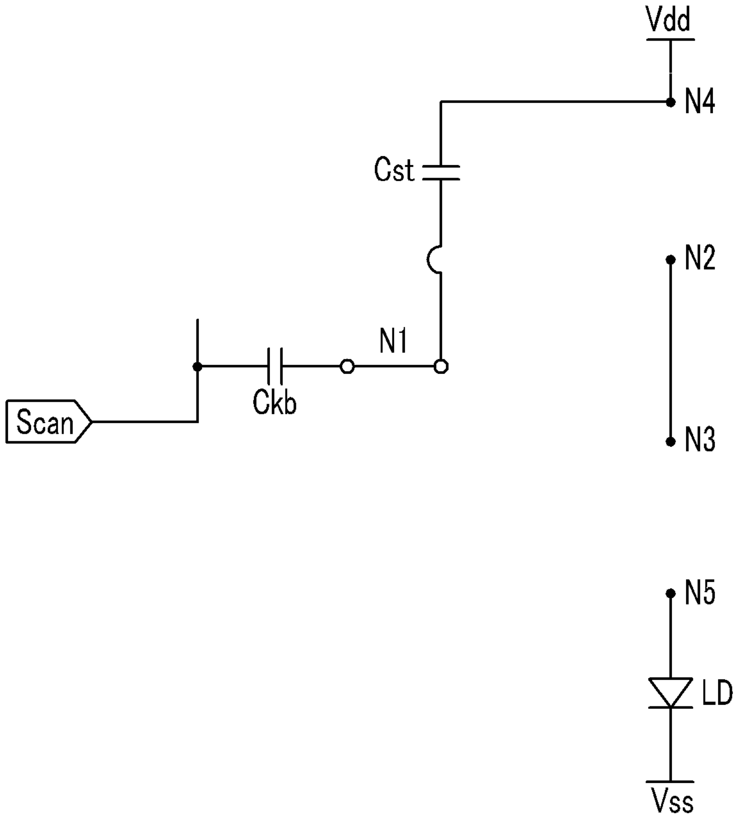

In the (n+1)-th horizontal period, the scan driver 400 changes the scanning signal Scan and the Vth control signal from the turn-on voltage to the turn-off voltage according to the scan control signal CONT1 provided by the signal controller 600. The first and third switching transistors Qs1 and Qs3 are turned off, so all the switching transistors Qs1 to Qs6 are off. As a result, the circuit formed by the capacitors Cst and Ckb maintains the charge at node N1. The circuit state is shown in FIG. 6.

In the (n+2)-th horizontal period, the scan driver 400 changes the Em control signal from the turn-off voltage to the turn-on voltage according to the scan control signal CONT1 provided by the signal controller 600. Hence, the fourth and fifth switching transistors Qs4 and Qs5 are turned on to provide a conductive path between the power supply voltage Vdd and the organic light emitting element LD. The current flowing to the organic light emitting element LD is controlled by the charge stored at the node N1 by the capacitors Cst and Ckb. The circuit state for the (n+2)-th horizontal period is shown in FIG. 7.

Figure 7:
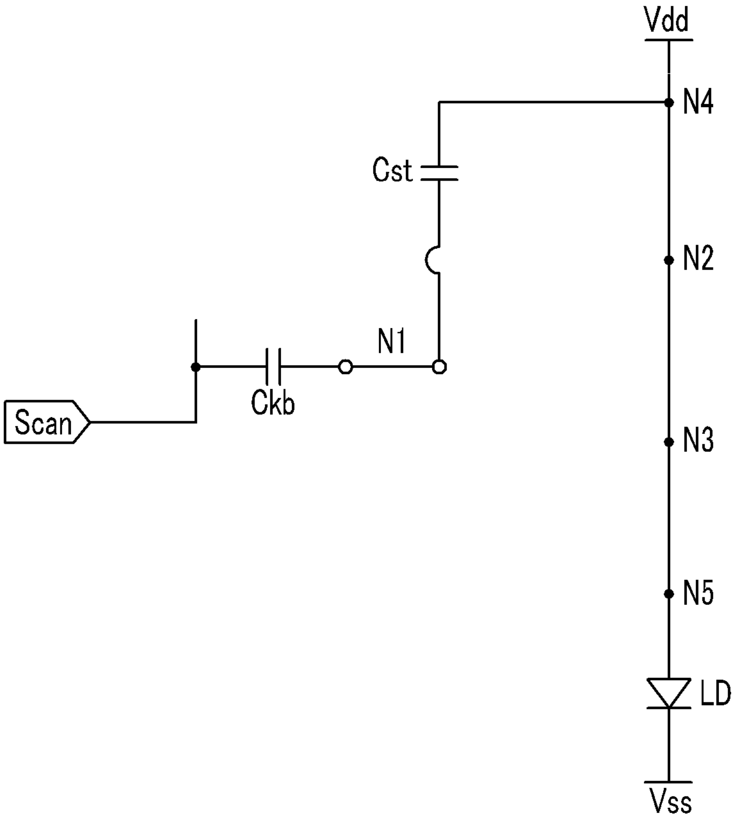

The circuit state of FIG. 7 is maintained until the Em control signal changes to the turn-off voltage in the next frame. In each frame, the organic light emitting element LD emits no light to display black when the Em control signal is at the turn off voltage, and the light emitting element LD emits light of the desired luminance when the Em control signal is at the turn-on voltage. Impulse driving is therefore provided.

As explained above, in the n-th horizontal period, in each pixel PX in the n-th row, the node N1 is charged to the voltage (Vdata+Vth) as illustrated in FIG. 5. Since Vth is negative, the node N1 voltage is below Vdata, and therefore the current through the driving transistor Qd is increased to increase the luminance when the current is allowed to flow through the light emitting element LD. Further, in the (n+1)-th period, the voltage $V_{N1}$ on the node N1 increases by some amount ΔV to the value $V_{N1}$=(ΔV+Vdata+Vth) due to the signal Scan changing to the turn-off voltage since the signal Scan is capacitively coupled to the node N1 by the capacitor Ckb. Starting the (n+2)-th horizontal period, this voltage $V_{N1}$ controls the current through the driving transistor Qd. This current is strongly dependent on the voltage difference Vgs−Vth=$V_{N1}$−$V_{N2}$−Vth=ΔV+Vdata−$V_{N2}$, where $V_{N2}$ is the voltage on the node N2. In this voltage difference, the Vth term cancels out. Therefore, the dependence of the current on Vth is reduced to make the circuit more tolerant to Vth variations. The current through the light emitting element LD becomes more stable.

As seen in FIG. 3, the Reset control signal and the PD control signal have the same waveform. Also, the scanning signal Scan and the Vth control signal the same waveform. If two signals have the same waveform, they can be provided as one signal. The corresponding terminals can be shorted together, and the corresponding scanning line and compensation line can be merged into a one line. In particular, the Reset and PD input terminals of each pixel PX (FIG. 2) can be shorted together and the corresponding lines can be combined, and the Scan and Vth input terminals of each pixel can be shorted together and the corresponding lines can be combined. The circuit complexity and the power consumption are therefore reduced.

Also, the only difference between the Reset control signal and the PD control signal on one hand and the scanning signal Scan on the other hand is that the scanning signal Scan is delayed by one horizontal period 1H. Therefore, the scanning signal Scan for the n-th row can be obtained as the Reset or PD control signal of the (n−1)-th row. Hence, the scanning signals can be used as the Reset and PD control signals and do not have to be separately generated. Accordingly, the signal drivers can be simplified. Moreover, the scanning signals Scan for adjacent rows of pixels differ only by a delay of one horizontal period 1H, and can be generated by delaying the scanning signal with a shift register. Further simplification of the scanning signal driver and reduction in power consumption are therefore possible.

Figure 8:
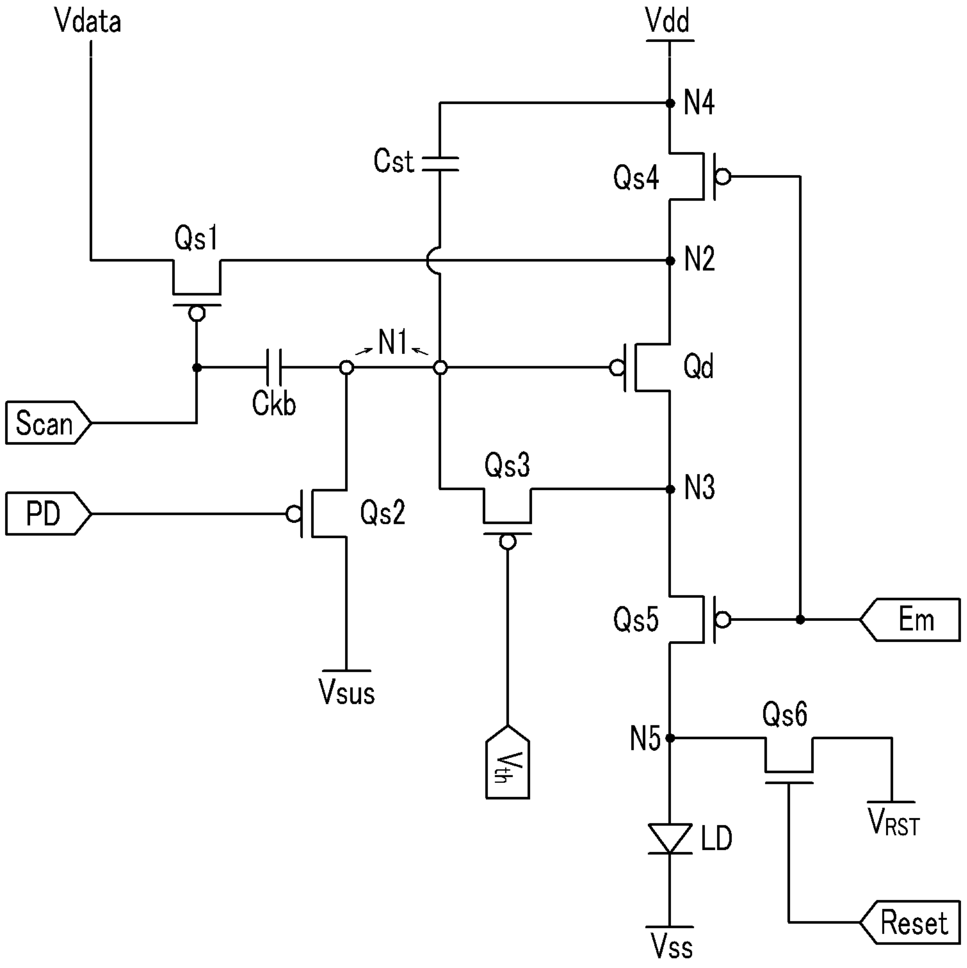
FIG. 8 shows a circuit diagram of a pixel in an organic light emitting device according to an exemplary embodiment of the present invention.
Figure 9:
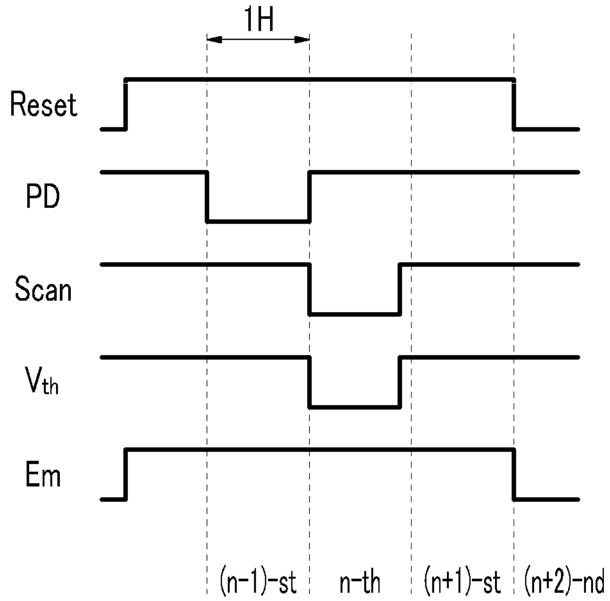
FIG. 9 shows waveform diagrams of driving signals applied to one row of pixels in an organic light emitting device of FIG. 8.
Figure 10:
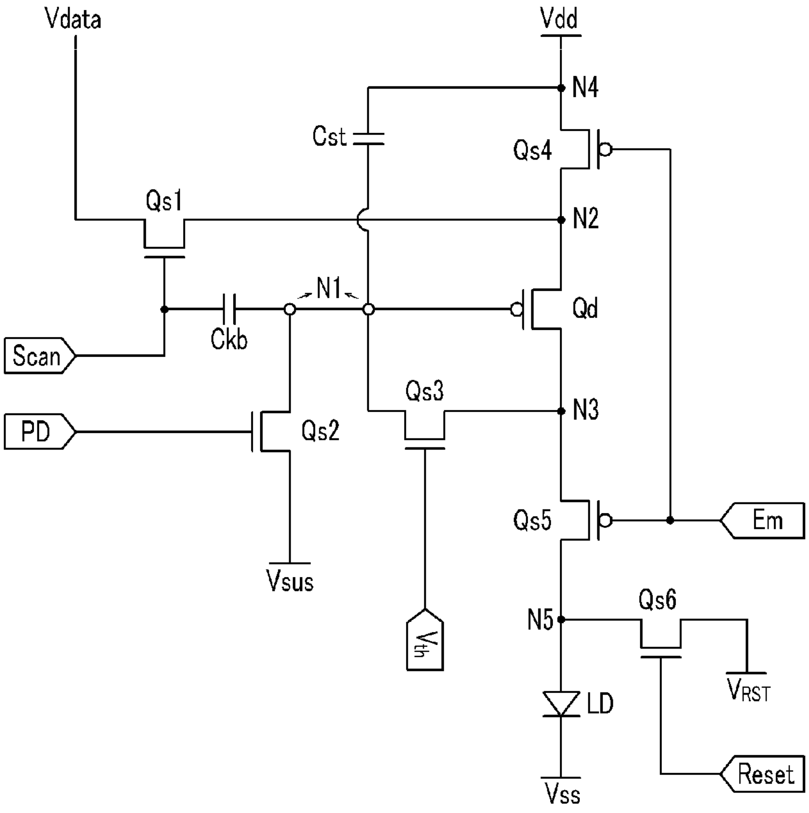
FIG. 10 shows a circuit diagram of a pixel in an organic light emitting device according to an exemplary embodiment of the present invention.

FIG. 8 to FIG. 11 show alternate embodiments identical to that of FIGS. 2 and 3 except as shown in the figures and described below. In FIG. 8, the sixth switching transistor Qs6 is an n-channel electric field effect transistor (NMOS) rather than a PMOS transistor as in FIG. 2. In FIG. 10, the switching transistors Qs1, Qs2, Qs3, and Qs6 are n-channel electric field effect transistors (NMOS). Only the fourth and fifth switching transistors Qs4 and Qs5 and the driving transistor Qd are PMOS transistors as in FIG. 2. The operating voltages are such that each of the PMOS transistors is turned off by the high voltage Vhigh on the transistor's control terminal, and is turned on by the low voltage Vlow on the transistor's control terminal. Each of the NMOS transistors is turned on by the high voltage Vhigh on the transistor's control terminal, and is turned off by the low voltage Vlow on the transistor's control terminal.

The embodiment of FIG. 8 will now be described with reference to FIG. 8 and FIG. 9.

FIG. 8 shows a circuit diagram of a pixel in an organic light emitting device such as that of FIG. 1, and FIG. 9 shows waveform diagrams of driving signals applied to an exemplary, n-th row of pixels of such a device.

As shown in FIG. 8, the pixel PX includes an organic light emitting element LD, a driving transistor Qd, capacitors Cst and Ckb, and six switching transistors Qs1-Qs6.

The driving transistor Qd has an output terminal, an input terminal, and a control terminal. The control terminal of the driving transistor Qd is connected at a node N1 to the capacitors Cst and Ckb, to an input terminal of the second switching transistor Qs2, and to an output terminal of the third switching transistor Qs3. The input terminal of the driving transistor Qd is connected at a node N2 to an output terminal of the first switching transistor Qs1 and an output terminal of the fourth switching transistor Qs4. The output terminal of the driving transistor Qd is connected at a node N3 to an input terminal of the third switching transistor Qs3 and an input terminal of the fifth switching transistor Qs5.

A first terminal of the capacitor Cst is connected at the node N1 to the driving transistor Qd and the second and third switching transistors Qs2 and Qs3. A second terminal of the capacitor Cst is connected at a node N4 to the driving voltage Vdd and an input terminal of the fourth switching transistor Qs4. A first terminal of the capacitor Ckb is connected at the node N1 to the driving transistor Qd and the second and third switching transistors Qs2 and Qs3. A second terminal of the capacitor Ckb is connected to the scanning signal line and a control terminal of the first switching transistor Qs1.

The switching transistors Qs1-Qs6 includes the first switching transistor Qs1 for transmitting the data voltages, a second switching transistor Qs2 for resetting a voltage at the control terminal of the driving transistor Qd, the third switching transistor Qs3 for controlling the voltage at the control terminal of the driving transistor Qd to compensate for variations of the threshold voltage of the driving transistor Qd, the fourth switching transistor Qs4 for applying the driving voltage Vdd to the driving transistor Qd, the fifth switching transistor Qs5 for applying the output signal of the driving transistor Qd to the organic light emitting element LD, and a sixth switching transistor Qs6 for resetting the anode voltage of the organic light emitting element LD.

The first switching transistor Qs1 transmits the data voltage Vdata to the input terminal of the driving transistor Qd in response to the scanning signal Scan. The second switching transistor Qs2 connects the sustain voltage Vsus to the node N1 in response to the control signal PD, and thus discharges the node N1 to the sustain voltage Vsus if the node N1 is above the sustain voltage. The third switching transistor Qs3 provides a conductive path between the nodes N1 and N3 in response to the control signal Vth, and thus transmits a voltage at the node N3 to the node N1. The fourth switching transistor Qs4 and the fifth switching transistor Qs5 are controlled by the control signal Em. The fourth switching transistor Qs4 transmits the driving voltage Vdd to the driving transistor Qd, and the fifth switching transistor Qs5 transmits an output current of the driving transistor Qd to the organic light emitting element LD. The sixth switching transistor Qs6 applies the reset voltage VRST to the node N5 in response to the control signal Reset.

In the present exemplary embodiment, the switching transistors Qs1 to Qs5 and the driving transistor Qd are p-channel electric field effect transistors (PMOS), and the sixth switching transistor Qs6 is an n-channel electric field effect transistor (NMOS). The electric field effect transistors can be, for example, thin film transistors (TFT), and may include polysilicon or amorphous silicon. A high voltage Vhigh turns off the switching transistors Qs1 to Qs5, and the low voltage Vlow turns on the switching transistors Qs1 to Qs5. The opposite is true for the sixth switching transistor Qs6. More particularly, the high voltage Vhigh turns on the sixth switching transistor Qs6, and the low voltage Vlow turns off the sixth switching transistor Qs6.

The organic light emitting element LD has its anode connected to the fifth and sixth switching transistors Qs5 and Qs6, and has its cathode connected to the common voltage Vss. The organic light emitting element LD displays images by emitting light of varying intensity depending on the current ILD supplied by the driving transistor Qd through the fifth switching transistor Qs5. The current ILD depends on the voltage between the control terminal and the input terminal of the driving transistor Qd. The sixth switching transistor Qs6 resets the anode voltage to the reset voltage VRST.

The sustain voltage Vsus is a low voltage. When it is provided to the node N1 it turns on the driving transistor Qd. The reset voltage VRST resets the anode voltage of the organic light emitting element LD. The sustain voltage Vsus, the reset voltage VRST, and the driving voltage Vdd can be applied through driving voltage lines.

FIG. 9 shows driving signals for the n-th row of pixels. In the (n−1)-th horizontal period, the Reset control signal and the PD control signal are at the respective turn-on voltages (Vhigh and Vlow respectively), and the scanning signal Scan is at its turn-off voltage (Vhigh). In the n-th horizontal period, the scanning signal Scan and the Vth control signal are at their respective turn-on voltages (Vlow for both signals). Some time after the n-th horizontal period (at the start of the (n+2)-th horizontal period in the embodiment of FIG. 9), the Em control signal becomes the turn-on voltage (Vlow). While the Em control signal is at the turn-on voltage, the organic light emitting element LD emits light. The Em control signal changes to the turn-off voltage (Vhigh) before the (n−1)-th horizontal period of the next frame. The duration of the turn-off voltage level of the Em control signal varies depending on the embodiment. In the present exemplary embodiment, the Reset control signal has the same waveform as the Em control signal. Therefore, the two signals can be provided as one signal, the respective compensation lines can be merged into one line, and the respective input terminals can be shorted together. Consequently, the driving circuit can be simplified and the power consumption can be reduced. Also, the sixth switching transistor Qs6 is reliably off when the fifth switching transistor Qs5 is on and is applying the current ILD from the driving transistor Qd to the organic light emitting element LD.

The states of an exemplary pixel PX in the n-th row in different horizontal periods will now be described.

In the (n−1)-th horizontal period, the Reset control signal and the PD control signal are at their respective turn-on voltages (Vhigh and Vlow respectively). As a result, the sixth switching transistor Qs6 and the second switching transistor Qs2 are on. Therefore, the sixth switching transistor Qs6 resets the anode of the organic light emitting element LD to the reset voltage VRST, and the second switching transistor Qs2 is turned on to reset the node N1 to the sustain voltage Vsus. Further, the sustain voltage Vsus at the node N1 turns on the driving transistor Qd.

In the n-th horizontal period, the PD control signal is changed from the turn-on voltage (Vlow) to the turn-off voltage (Vhigh), and the scanning signal Scan and the Vth control signal are changed from their turn-off voltages (Vhigh) to the turn-on voltages (Vlow). The second switching transistor Qs2 is turned off, and the first switching transistor Qs1 is turned on to connect the data voltage Vdata to the input terminal (N2 node) of the driving transistor Qd. Also, the third switching transistor Qs3 is turned on by the Vth control signal to provide a conductive path between the nodes N1 and N3. Since the node N1 was reset to the sustain voltage Vsus and the driving transistor Qd is on, the voltage difference between the data voltage Vdata at the node N2 and the sustain voltage Vsus at the node N1 causes current to flow from the node N2 through the node N3 to the node N1. The node N1 accumulates charge stored in the capacitors Cst and Ckb. Of the two capacitors Cst and Ckb, the capacitor Cst performs the main function, and the capacitor Ckb performs the auxiliary function. During the n-th horizontal period, the node N1 is changed to the sum Vdata+Vth of the data voltage Vdata and the threshold voltage Vth of the driving transistor Qd. The third switching transistor Qs3 and the driving transistor Qd may or may not have the same threshold voltage Vth. The sixth switching transistor Qs6 remains on because its control terminal continuously receives the turn-on voltage (Vhigh), and consequently the anode voltage of the organic light emitting element LD is maintained at the reset voltage VRST.

In or shortly before the (n+1)-th horizontal period, the scanning signal Scan and the Vth control signal are changed from their turn-on voltages (Vlow) to the turn-off voltages (Vhigh). The first and third switching transistors Qs1 and Qs3 turn off. Therefore, in the (n+1)-th horizontal period, the switching transistors Qs1 to Qs5 are off, and only the switching transistor Qs6 remains on. As a result, the circuit formed by the capacitors Cst and Ckb maintains the charge at the node N1. The anode of the organic light emitting element LD remains at the reset voltage VRST.

In the (n+2)-th horizontal period, the Em control signal is changed from the turn-off voltage (Vhigh) to the turn-on voltage (Vlow), and the Reset control signal is changed from the turn-on voltage (Vhigh) to the turn-off voltage (Vlow). Hence, the fourth and fifth switching transistors Qs4 and Qs5 are turned on to provide a conductive path from the power supply voltage Vdd to the organic light emitting element LD, and the sixth switching transistor Qs6 is turned off. The current to the organic light emitting element LD is determined by charge stored at the node N1 by the capacitors Cst and Ckb.

Beginning in the (n+2)-th horizontal period and through subsequent horizontal periods, the circuit state is unchanged until the Em control signal becomes the turn-off voltage (Vhigh), or the Reset control signal becomes the turn-on voltage (Vlow). In each frame, the organic light emitting element LD emits no light to display black when the Em control signal is the turn off voltage (Vhigh), and emits light of the desired luminance when the Em control signal is the turn-on voltage (Vlow). Impulse driving is therefore provided.

An exemplary embodiment of FIG. 10 and FIG. 11 will now be described. This embodiment is identical to the embodiments of FIG. 3 to FIG. 9 except as illustrated in the figures and described below.

FIG. 10 shows a circuit diagram of a pixel in an organic light emitting device such as that of FIG. 1. FIG. 11 shows waveform diagrams of driving signals applied to one row of pixels in an organic light emitting device of FIG. 10.

As shown in FIG. 10, each pixel PX includes an organic light emitting element LD, a driving transistor Qd, capacitors Cst and Ckb, and six switching transistors Qs1-Qs6.

The driving transistor Qd has an output terminal, an input terminal, and a control terminal. The control terminal of the driving transistor Qd is connected at a node N1 to the capacitors Cst and Ckb, to an input terminal of the second switching transistor Qs2, and an output terminal of the third switching transistor Qs3. The input terminal of the driving transistor Qd is connected at a node N2 to an output terminal of the first switching transistor Qs1 and an output terminal of the fourth switching transistor Qs4. The output terminal of the driving transistor Qd is connected at a node N3 to an input terminal of the third switching transistor Qs3 and an input terminal of the fifth switching transistor Qs5.

A first terminal of the capacitor Cst is connected at the node N1 to the driving transistor Qd and the second and third switching transistors Qs2 and Qs3. A second terminal of the capacitor Cst is connected at a node N4 to the driving voltage Vdd and an input terminal of the fourth switching transistor Qs4. A first terminal of the capacitor Ckb is connected at the node N1 to the driving transistor Qd and the second and third switching transistors Qs2 and Qs3. A second terminal of the capacitor Ckb is connected to the corresponding scanning signal line and a control terminal of the first switching transistor Qs1.

The switching transistors Qs1-Qs6 include the first switching transistor Qs1 for transmitting a data voltage, the second switching transistor Qs2 for resetting the voltage at the control terminal of the driving transistor Qd, the third switching transistor Qs3 for controlling the voltage at the control terminal of the driving transistor Qd to compensate for variations of the threshold voltage of the driving transistor Qd, a fourth switching transistor Qs4 for applying the driving voltage Vdd to the driving transistor Qd, the fifth switching transistor Qs5 for applying the output signal of the driving transistor Qd to the organic light emitting element LD, and a sixth switching transistor Qs6 for resetting the anode voltage of the organic light emitting element LD.

The first switching transistor Qs1 transmits the data voltage Vdata to the input terminal of the driving transistor Qd in response to the scanning signal Scan. The second switching transistor Qs2 connects the node N1 to the sustain voltage Vsus in response to the control signal PD, and thus discharges the node N1 to the sustain voltage Vsus. The third switching transistor Qs3 provides a conductive path between the nodes N1 and N3 in response to the control signal Vth, and thus connects the voltage at the node N3 to the node N1. The fourth switching transistor Qs4 and the fifth switching transistor Qs5 are controlled by the control signal Em. The fourth switching transistor Qs4 transmits the driving voltage Vdd to the driving transistor Qd, and the fifth switching transistor Qs5 transmits the output current of the driving transistor Qd to the organic light emitting element LD. The sixth switching transistor Qs6 applies the reset voltage VRST to the node N5 in response to the control signal Reset.

In the present exemplary embodiment, the fourth and fifth switching transistors Qs4 and Qs5 and the driving transistor Qd are p-channel electric field effect transistors (PMOS), and the first, second, third, and sixth switching transistors Qs1, Qs2, Qs3, and Qs6 are n-channel electric field effect transistors (NMOS). In general, PMOS transistors tend to have lower leakage currents than NMOS transistors. Also, the PMOS transistors' threshold voltages are not changed as much during continuous operation as the NMOS transistors' threshold voltages. Hence, the pixel of FIG. 10 uses the PMOS transistors in the path between the nodes N4 and N5. The first, second, third, and sixth switching transistors Qs1, Qs2, Qs3, and Qs6 are NMOS transistors. The electric field effect transistors can for example be thin film transistors (TFT), and may include polysilicon or amorphous silicon. The operating voltages are such that each of the fourth and fifth switching transistors Qs4 and Qs5 is turned off by the high voltage Vhigh on the transistor's control terminal, and is turned on by the low voltage Vlow on the control terminal. The first, second, third, and sixth switching transistors Qs1, Qs2, Qs3, and Qs6 are the opposite. In other words, each of these transistors is turned on by the high voltage Vhigh on the control terminal, and is turned off by the low voltage Vlow on the control terminal.

The organic light emitting element LD has its anode connected to the fifth and sixth switching transistors Qs5 and Qs6, and has its cathode connected to the common voltage Vss. The organic light emitting element LD displays images by emitting light of varying intensity depending on the current ILD supplied by the driving transistor Qd through the fifth switching transistor Qs5. The current ILD depends on the voltage between the control terminal and the input terminal of the driving transistor Qd. The sixth switching transistor Qs6 resets the anode to the reset voltage VRST.

The sustain voltage Vsus is a low voltage. When it is provided to the node N1 it turns on the driving transistor Qd. The reset voltage VRST resets the anode voltage of the organic light emitting element LD. The sustain voltage Vsus, the reset voltage VRST, and the driving voltage Vdd can be applied through driving voltage lines.

Figure 11:
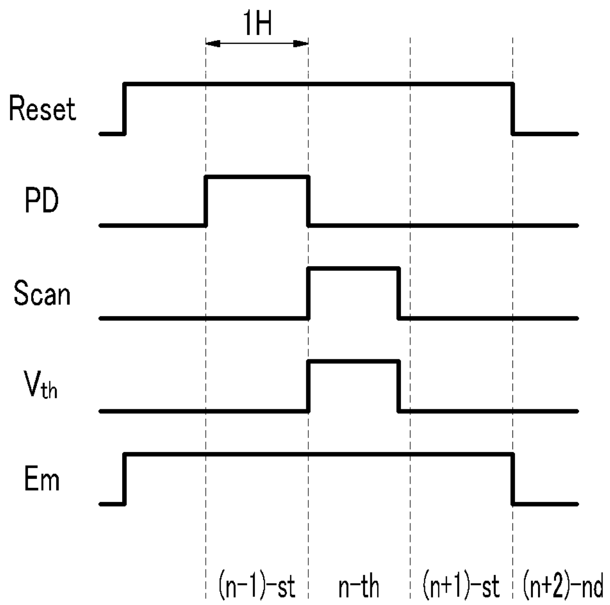
FIG. 11 shows waveform diagrams of driving signals applied to one row of pixels in an organic light emitting device of FIG. 10.

FIG. 11 shows driving signals for the n-th row of pixels. In the (n−1)-th horizontal period, the Reset control signal and the PD control signal are at their turn-on voltages (Vhigh), and the scanning signal Scan is at its turn-off voltage (Vlow). In the n-th horizontal period, the scanning signal Scan and the Vth control signal are at their turn-on voltages (Vhigh). Some time after the n-th horizontal period (at the start of the (n+2)-th horizontal period in FIG. 11), the Em control signal becomes its turn-off voltage (Vlow). While the Em control signal is at the turn-on voltage, the organic light emitting element LD emits light. The Em control signal changes to its turn-off voltage (Vhigh) before the (n−1)-th horizontal period of the next frame. The duration of the turn-off voltage level of the Em control signal depends on the particular embodiment. In the present exemplary embodiment, the Reset control signal has the same waveform as the Em control signal, and therefore these two signals can be merged into a single signal, delivered by one line, and the respective input terminals can be shorted together. The driving circuit can therefore be simplified. Also, the sixth switching transistor Qs6 is reliably off when the fifth switching transistor Qs5 is on to apply the current ILD from the driving transistor Qd to the organic light emitting element LD.

The states of an exemplary pixel PX in the n-th row in different horizontal periods will now be described.

In the (n−1)-th horizontal period, the reset control signal and the PD control signal are at their turn-on voltages (Vhigh). The sixth switching transistor Qs6 receiving the Reset control signal and the second switching transistor Qs2 receiving the PD control signal are on. Therefore, the sixth switching transistor Qs6 resets the anode of the organic light emitting element LD to the reset voltage VRST, and the second switching transistor Qs2 resets the node N1 to the sustain voltage Vsus. Further, the sustain voltage Vsus at the node N1 turns on the driving transistor Qd.

In the n-th horizontal period, the PD control signal is changed from the turn-on voltage (Vlow) to the turn off voltage (Vhigh), and the scanning signal Scan and the Vth control signal are changed from their turn-off voltages (Vlow) to the turn-on voltages (Vhigh). The second switching transistor Qs2 is turned off, and the first switching transistor Qs1 receiving the scanning signal Scan is turned on to transmit the data voltage Vdata to the input terminal (N2 node) of the driving transistor Qd. Also, the third switching transistor Qs3 receiving the Vth control signal is turned on to provide a conductive path between the nodes N1 and N3. Since the node N1 was reset to the sustain voltage Vsus and the driving transistor Qd is turned on, the voltage difference between the data voltage Vdata at the node N2 and the sustain voltage Vsus at the node N1 causes current to flow from the node N2 through the node N3 to the node N1. The node N1 accumulates charge stored in the capacitors Cst and Ckb. Of the two capacitors, the capacitor Cst performs the main function, and the capacitor Ckb performs the auxiliary function. During the n-th horizontal period, the node N1 is charged to the sum Vdata+Vth of the data voltage Vdata and the threshold voltage Vth of the driving transistor Qd. The third switching transistor Qs3 and the driving transistor Qd may or may not have the same threshold voltage Vth. The sixth switching transistor Qs6 remains on because its control terminal continuously receives the turn-on voltage (Vhigh), and consequently the anode of the organic light emitting element LD remains at the reset voltage VRST.

In or shortly before the (n+1)-th horizontal period, the scanning signal Scan and the Vth control signal transition from their turn-on voltages (Vhigh) to their turn-off voltages (Vlow). The first and third switching transistors Qs1 and Qs3 turn off. Therefore, in the (n+1)-th horizontal period, the switching transistors Qs1 to Qs5 are off, and only the switching transistor Qs6 remains on. As a result, the circuit formed by the capacitors Cst and Ckb maintains the charge on the node N1. The anode of the organic light emitting element LD is maintained at the reset voltage VRST.

In the (n+2)-th horizontal period, the Em control signal is changed from its turn-off voltage (Vhigh) to the turn-on voltage (Vlow), and the Reset control signal is changed from the turn-on voltage (Vhigh) to the turn-off voltage (Vlow). Hence, the fourth and fifth switching transistors Qs4 and Qs5 are turned on to provide a conductive path from the power supply voltage Vdd to the organic light emitting element LD, and the sixth switching transistor Qs6 is turned off. The current to the organic light emitting element LD is determined by the charge stored at the node N1 by the capacitors Cst and Ckb.

In the (n+3)-th and subsequent horizontal periods, the circuit is maintained in the same state as in the (n+2)-th horizontal period until the Em control signal becomes the turn-off voltage (Vhigh) or the Reset signal becomes the turn-on voltage (Vhigh). In each frame, the organic light emitting element LD emits no light to display black when the Em control signal is the turn off (Vhigh) voltage, and emits light of the desired luminance when the Em control signal is the turn-on voltage (Vlow). Impulse driving is therefore provided.

The circuit of FIGS. 10 and 11 is tolerant to the variations of the threshold voltage Vth of the driving transistor Qd, and can be implemented with a simpler driving circuit and lower power consumption, due to reasons similar to the reasons given above for the circuit of FIGS. 2-7.

A pixel with a driving transistor and six switching transistors has been described. A pixel with a driving transistor and five switching transistors will now be described with reference to FIG. 12 and FIG. 13. The embodiment of FIGS. 12 and 13 is identical to the embodiments described above in connection with FIGS. 2-11 except as shown in the drawings and described below.

Figure 12:
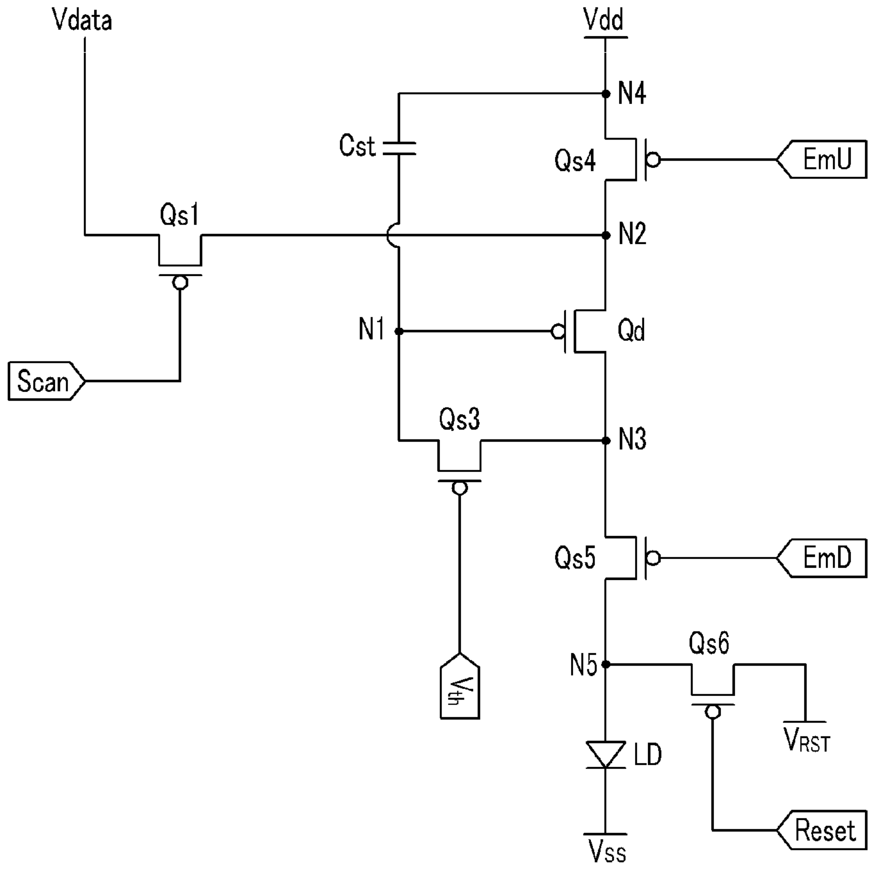
FIG. 12 shows a circuit diagram of a pixel in an organic light emitting device according to another exemplary embodiment of the present invention.
Figure 13:
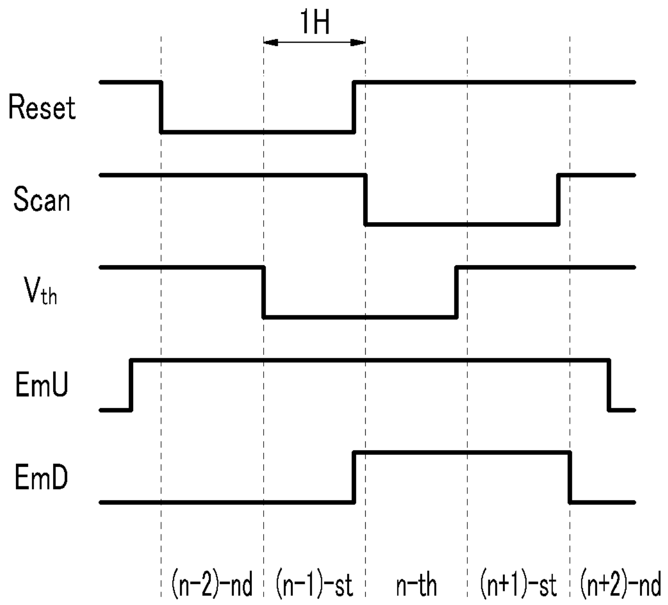
FIG. 13 shows waveform diagrams of driving signals applied to one row of pixels in an organic light emitting device of FIG. 12.

FIG. 12 shows a circuit diagram of a pixel in an organic light emitting device such shown as in FIG. 1, and FIG. 13 shows waveform diagrams of driving signals applied to an exemplary, n-th row of pixels in the organic light emitting device of FIG. 12.

The embodiment of FIG. 12 is similar to FIG. 2 but omits the second switching transistor Qs2 and the capacitor Ckb.

As shown in FIG. 12, each pixel PX includes an organic light emitting element LD, a driving transistor Qd, a capacitor Cst, and five switching transistors Qs1, Qs3, Qs4, Qs5, and Qs6.

The driving transistor Qd has an output terminal, an input terminal, and a control terminal. The control terminal of the driving transistor Qd is connected at the node N1 to the capacitor Cst and the output terminal of the third switching transistor Qs3. The input terminal of the driving transistor Qd is connected at the node N2 to the output terminal of the first switching transistor Qs1 and the output terminal of the fourth switching transistor Qs4 The output terminal of the driving transistor Qd is connected at the node N3 to the input terminal of the third switching transistor Qs3 and the input terminal of the fifth switching transistor Qs5.

The first terminal of the capacitor Cst is connected at the node N1 to the driving transistor Qd and the third switching transistor Qs3. The second terminal of the capacitor Cst is connected at the node N4 to the driving voltage Vdd and the input terminal of the fourth switching transistor Qs4.

The first switching transistor Qs1 is for transmitting a data voltage. The third switching transistor Qs3 is for controlling the voltage at the control terminal of the driving transistor Qd to compensate for variations of the threshold voltage of the driving transistor Qd. The fourth switching transistor Qs4 is for applying the driving voltage Vdd to the driving transistor Qd. The fifth switching transistor Qs5 is for applying the output signal of the driving transistor Qd to the organic light emitting element LD. The sixth switching transistor Qs6 is for resetting the anode of the organic light emitting element LD. The third, fifth and sixth switching transistors Qs3, Qs5, and Qs6 are used to reset the voltage at the node N1.

The first switching transistor Qs1 transmits the data voltage Vdata to the input terminal of the driving transistor Qd in response to the scanning signal Scan. The third switching transistor Qs3 provides a conductive path between the nodes N1 and N3 in response to the control signal Vth, and thus connects the voltage at the node N3 to the node N1. The fourth switching transistor Qs4 transmits the driving voltage Vdd to the driving transistor Qd in response to a control signal EmU. The fifth switching transistor Qs5 transmits the output current of the driving transistor Qd to the organic light emitting element LD in response to a control signal EmD. The sixth switching transistor Qs6 applies the reset voltage VRST to the node N5 in response to the control signal Reset. Also, the third, fifth, and sixth switching transistors Qs3, Qs5, and Qs6 are turned on to interconnect the node N1 and the reset voltage VRST and thus to reset the voltage at the node N1 to the reset voltage VRST.

For each row, the display device includes signal lines EmU and EmD carrying respectively the EmU control signal and the EmD control signal to the row's pixels.

In the present exemplary embodiment, the switching transistors Qs1, Qs3, Qs4, Qs5, and Qs6 and the driving transistor Qd are p-channel electric field effect transistors (PMOS). These can be thin film transistors (TFT) for example, and may include polysilicon or amorphous silicon. When provided to the respective transistors' control terminals, the high voltage Vhigh turns the transistors off, and the low voltage Vlow turns the transistors on.

The organic light emitting element LD has its anode connected to the fifth and sixth switching transistors Qs5 and Qs6, and has its cathode connected to the common voltage Vss. The organic light emitting element LD displays images by emitting light of varying intensity depending on the current ILD supplied by the driving transistor Qd through the fifth switching transistor Qs5. The current ILD depends on the voltage between the control terminal and the input terminal of the driving transistor Qd. The sixth switching transistor Qs6 resets the anode to the reset voltage VRST.

The reset voltage VRST provides a reset voltage for the anode voltage of the organic light emitting element LD and for the node N1. The reset voltage VRST and the driving voltage Vdd can be applied through the driving voltage lines.

Operation of the organic light emitting device of FIG. 12 will now be described in detail with reference to FIG. 13 to FIG. 18.

FIG. 13 shows waveform diagrams of driving signals for an n-th row of pixels, and FIG. 14 to FIG. 18 show equivalent circuit diagrams of a pixel for each horizontal period shown in FIG. 13.

Referring to FIG. 13, in the (n−2)-th and (n−1)-th horizontal periods, the Reset and EmD control signals are at their turn-on voltages (Vlow). The scanning signal Scan is kept at its turn-off voltage (Vhigh) during this time (2H), and will become the turn-on voltage (Vlow) in the n-th horizontal period. In the (n−1)-th horizontal period, the Vth control signal is at its turn-on voltage (Vlow) together with the Reset and the EmD control signals. In the n-th horizontal period (shortly before the n-th horizontal period as shown in FIG. 13), the Reset and EmD control signals change to the turn-off voltages (Vhigh), but the Vth control signal remains asserted (i.e. at the turn-on voltage Vlow), and the scanning signal Scan is also asserted (Vlow). In the (n+1)-th horizontal period or shortly before the end of the n-th horizontal period, the Vth control signal is deasserted (e.g. becomes the turn-off voltage Vhigh), and the scanning signal Scan remains at the turn-on voltage. The EmD control signal and the EmU control signal become asserted (Vlow) some time later, at the start of the (n+2)-th horizontal period in the present exemplary embodiment. While the EmU and EmD control signals are at the turn-on voltage (Vlow), the organic light emitting element LD emits light. The EmU control signal is deasserted (Vhigh) before the (n−2)-th horizontal period of the next frame. The duration of the assertion of both of the EmU and EmD control signals depends on the particular embodiment. Since the transistors in the exemplary embodiment of FIG. 12 are p-channel electric field effect transistors, the turn-on voltage is the low voltage and the turn-off voltage is the high voltage.

The states of pixels PX in the n-th row in different horizontal periods will now be described.

Figure 14:
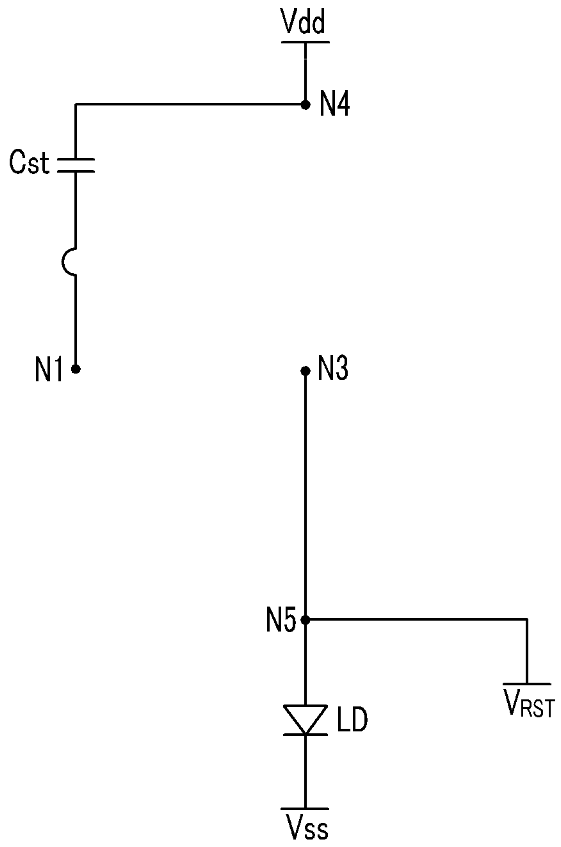
FIG. 14 to FIG. 18 show equivalent circuit diagrams of a pixel in different horizontal periods marked in FIG. 13.

In the (n−2)-th horizontal period, the Reset and EmD control signals are asserted (Vlow). The Reset control signal becomes asserted in the (n−2)-th horizontal period, and the EmD control signal stays asserted from the previous frame. The sixth switching transistor Qs6 receiving the Reset control signal is turned-on, and the fifth switching transistor Qs5 remains on from the previous frame when it received the turn-on voltage. Therefore, the sixth switching transistor Qs6 resets the anode of the organic light emitting element LD to the reset voltage VRST, and the fifth switching transistor Qs5 provides a conductive path between the nodes N3 and N5. This state is shown in FIG. 14.

Figure 15:
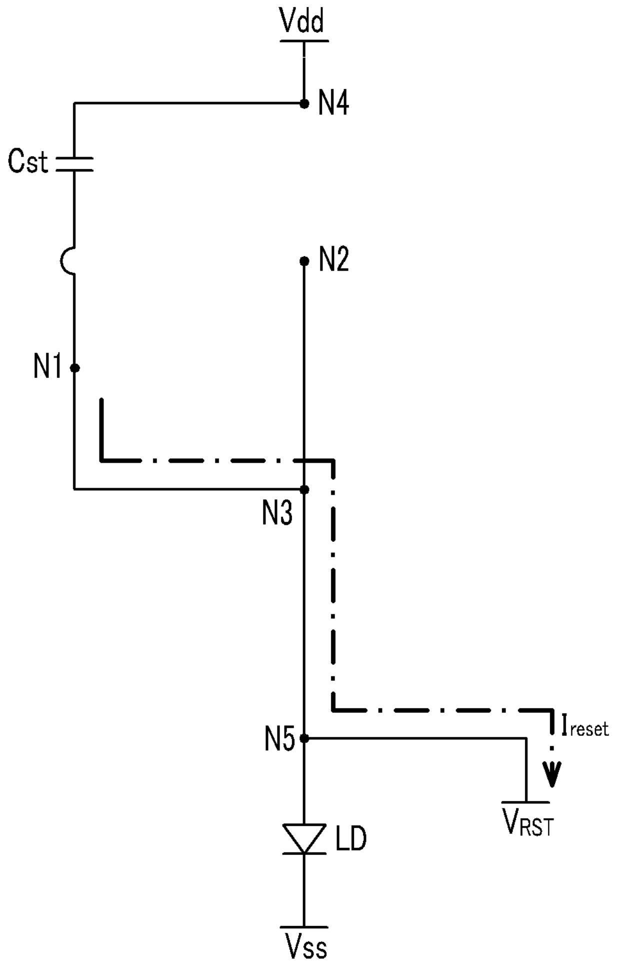

In the (n−1)-th horizontal period, the Reset control signal and the EmD control signal remain asserted, and the Vth control signal is changed from the turn-off voltage (Vhigh) to the turn-on voltage (Vlow). The fifth and sixth switching transistors Qs5 and Qs6 remain on, and the third switching transistor Qs3 is turned on. Therefore, the node N1 is connected to the reset voltage VRST through the nodes N3 and N5, and the node N1 discharges to the reset voltage VRST. As a result, the control terminal of the driving transistor Qd is pulled down to turn on the driving transistor Qd. The anode of the organic light emitting element LD is connected to the node N5 and remains at the reset voltage VRST. This state is shown in FIG. 15.

Figure 16:
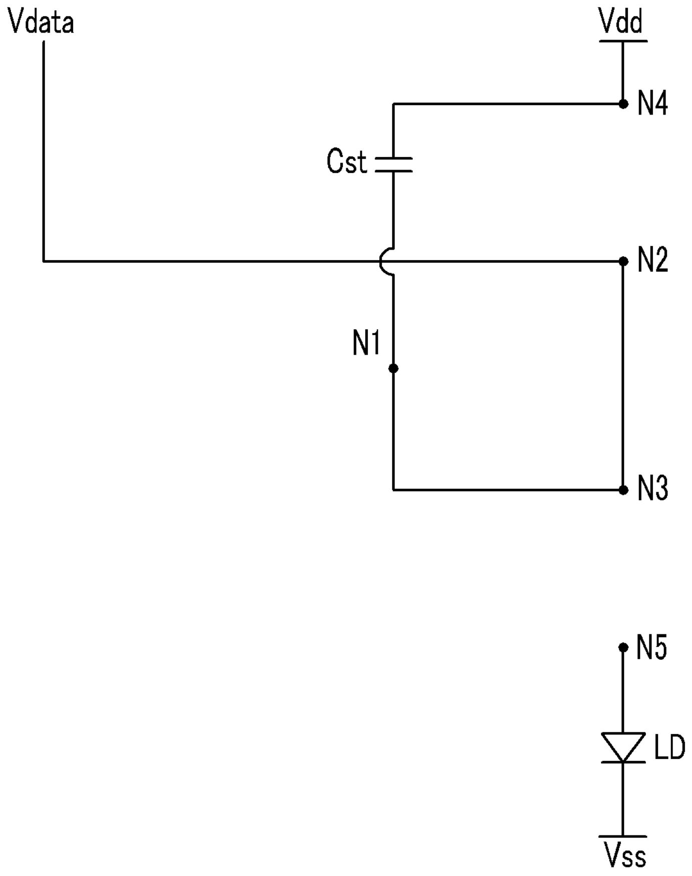

In the n-th horizontal period (or shortly before as in FIG. 13), the Reset control signal and the EmD control signal become deasserted (Vhigh), and the Vth control signal remains asserted (Vlow). The scanning signal Scan becomes asserted (Vlow). The fifth and sixth switching transistors Qs5 and Qs6 are turned off, the third switching transistor Qs3 remains on, and the first switching transistor Qs1 receiving the scanning signal Scan is turned on to connect the data voltage Vdata to the input terminal (node N2) of the driving transistor Qd. The data voltage Vdata is connected to the node N1 through the node N3 and the node N1, and the corresponding charge is stored in the capacitor Cst. The node N1 is charged to the sum Vdata+Vth of the data voltage Vdata input in the n-th horizontal period and the threshold voltage Vth of the driving transistor Qd. The third switching transistor Qs3 and the driving transistor Qd may or may not have the same threshold voltage. The circuit state in the n-th horizontal period is shown in FIG. 16.

Figure 17:
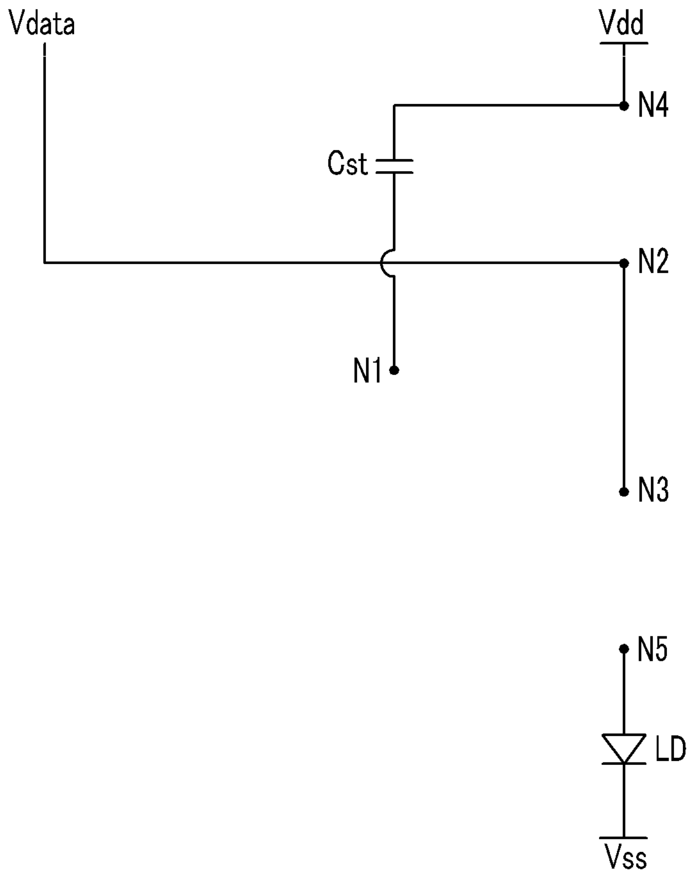

In the (n+1)-th horizontal period (or shortly before as in FIG. 13), the Vth control signal becomes deasserted (Vhigh), and the scanning signal Scan remains asserted (Vlow). The third switching transistor Qs3 is turned off, and the first switching transistor Qs1 remains on to apply the data voltage to the node N2. However, since the third switching transistor Qs3 between the nodes N3 and N1 is turned off, the input data voltage Vdata is not connected to the node N1. Hence, the node N1 is maintained at the voltage level (data voltage Vdata input in the n-th horizontal period+threshold voltage Vth) established in the n-th horizontal period. The circuit state in the (n+1)-th horizontal period is shown in FIG. 17.

Figure 18:
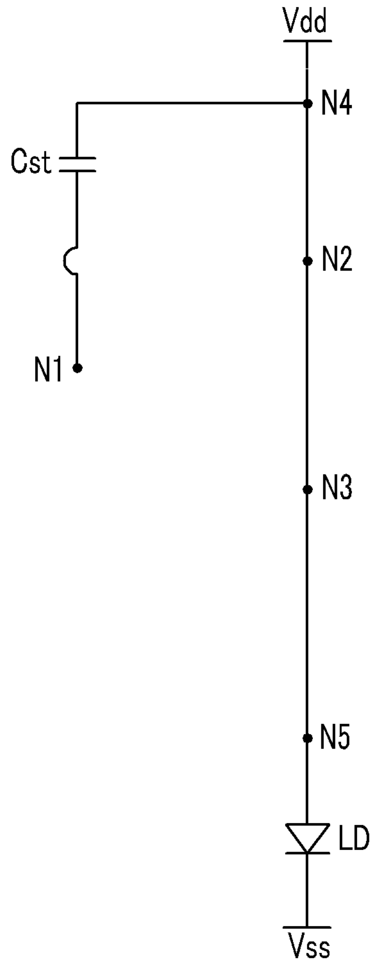

In the (n+2)-th horizontal period, the scanning signal Scan changes from the turn-on voltage (Vlow) to the turn-off voltage (Vhigh), and the EmU control signal and EmD control signal are changed to the turn-on voltages (Vlow). (In FIG. 20, the EmD control signal is deasserted near the end of the (n+1)-th horizontal period.) The fourth and fifth switching transistors Qs4 and Qs5 are turned on to provide a conductive path between the power supply voltage Vdd and the organic light emitting element LD. The current flowing to the organic light emitting element LD is determined by the charge stored at the node N1 by the capacitor Cst. The circuit state is shown in FIG. 18.

Referring to the waveforms of FIG. 13, the EmU control signal becomes asserted later than the EmD control signal. Therefore, the fifth switching transistor Qs5 is turned on in advance (unlike in the embodiments described in connection with the previous figures).

The impulse driving is controlled by the EmU control signal since this signal controls the time of displaying black. In particular, the circuit state of FIG. 18 is maintained from the (n+3)-th horizontal period until the EmU control signal is deasserted (Vhigh). In each frame, the organic light emitting element LD emits no light to display black when the EmU control signal is deasserted, and emits light of the desired luminance when the EmU control signal is asserted. Therefore, impulse driving is provided in which the time for displaying black can be controlled through the EmU control signal. The EmU control signal will be deasserted before the (n−2)-th horizontal period of the next frame, at a time which can be set as desired for the particular embodiment.

As shown in FIG. 13, in each frame, the scanning signal Scan for the n-th row is kept asserted over a time interval overlapping with the n-th and (n+1)-th horizontal periods. This interval overlaps with the time of asserting the scanning signal Scan for the (n+1)-th row, when the data voltage Vdata is at a level intended for the pixel in the (n+1)-th row. This overlap does not create a problem however because in the (n+1)-th horizontal period the data voltage Vdata is disconnected from the node N1 in the n-th row (due to the Vth control signal being deasserted in the n-th row). Extending the assertion period of the scanning signal Scan to a value of almost 2H allows the driving circuit to be simpler by facilitating synchronization between the scanning signal Scan and other signals (the Reset and Vth control signals).

Figure 19:
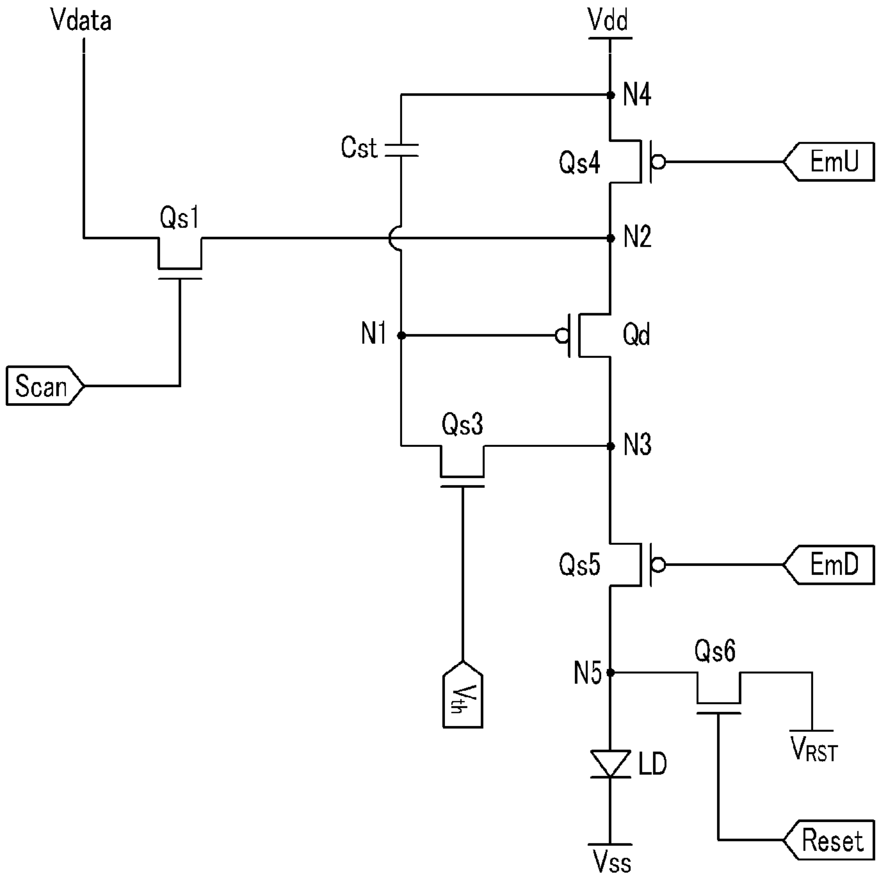
FIG. 19 show a circuit diagram of a pixel in an organic light emitting device according to another exemplary embodiment of the present invention.
Figure 20:
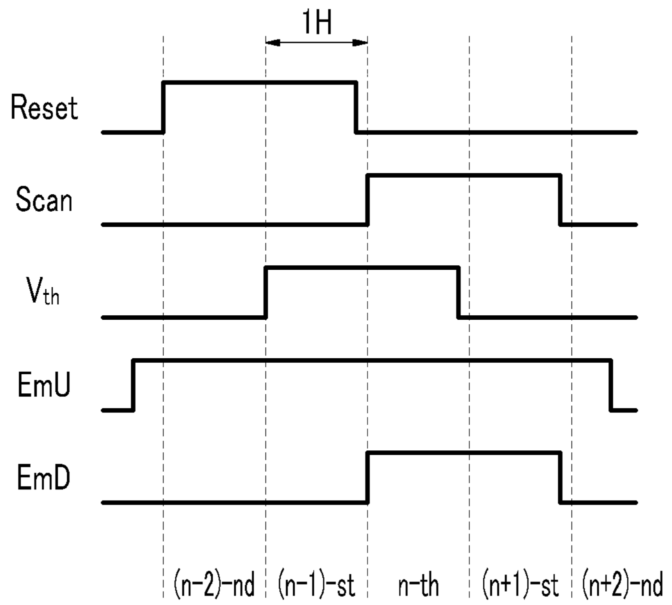
FIG. 20 shows waveform diagrams of driving signals applied to one row of pixels in an organic light emitting device of FIG. 19.

FIG. 19 and FIG. 20 illustrate another embodiment which is identical to those of FIGS. 2-18 except as shown in the figures and described below. The embodiment of FIGS. 19-20 is similar to the embodiment of FIG. 12 but uses n-channel electric field effect transistors (NMOS) for the first, third, and sixth switching transistors Qs1, Qs3, and Qs6.

FIG. 19 show a circuit diagram of a typical pixel PX in an organic light emitting device such as shown in FIG. 1. As shown in FIG. 19, each pixel PX includes an organic light emitting element LD, a driving transistor Qd, a capacitor Cst, and five switching transistors Qs1, Qs3, Qs4, Qs5, and Qs6.

The driving transistor Qd has an output terminal, an input terminal, and a control terminal. The control terminal of the driving transistor Qd is connected at a node N1 to the capacitor Cst and an output terminal of the third switching transistor Qs3. The input terminal of the driving transistor Qd is connected at a node N2 to an output terminal of the first switching transistor Qs1 and an output terminal of the fourth switching transistor Qs4. The output terminal of the driving transistor Qd is connected at a node N3 to an input terminal of the third switching transistor Qs3 and an input terminal of the fifth switching transistor Qs5.

A first terminal of the capacitor Cst is connected at the node N1 to the driving transistor Qd and the third switching transistor Qs3. A second terminal of the capacitor Cst is connected at a node N4 to the driving voltage Vdd and an input terminal of the fourth switching transistor Qs4.

The switching transistors Qs1, Qs3, Qs4, Qs5, and Qs6 include the first switching transistor Qs1 for transmitting a data voltage, the third switching transistor Qs3 for compensating for variations of the threshold voltage of the driving transistor Qd, the fourth switching transistor Qs4 for applying the driving voltage Vdd to the driving transistor Qd, the fifth switching transistor Qs5 for applying the output signal of the driving transistor Qd to the organic light emitting element LD, and a sixth switching transistor Qs6 for resetting the anode voltage of the organic light emitting element LD. In this embodiment, the voltage at the node N1 is reset through the third, fifth and sixth switching transistors Qs3, Qs5, and Qs6.

The first switching transistor Qs1 transmits the data voltage Vdata to the input terminal of the driving transistor Qd in response to the scanning signal Scan. The third switching transistor Qs3 provides a conductive path between the nodes N1 and N3 in response to the control signal Vth, and thus connects the voltage at the node N3 to the node N1. The fourth switching transistor Qs4 transmits the driving voltage Vdd to the driving transistor Qd in response to a control signal EmU. The fifth switching transistor Qs5 transmits the output current of the driving transistor Qd to the organic light emitting element LD in response to a control signal EmD. The sixth switching transistor Qs6 applies a reset voltage VRST to the node N5 in response to the control signal Reset. Also, the third, fifth, and sixth switching transistors Qs3, Qs5, and Qs6 are turned on to interconnect the node N1 and the reset voltage VRST and thus reset the node N1 to the reset voltage VRST.

In the present exemplary embodiment, the fourth and fifth switching transistors Qs4 and Qs5 and the driving transistor Qd are p-channel electric field effect transistors (PMOS), and the first, third, and sixth switching transistors Qs1, Qs3, and Qs6 are n-channel electric field effect transistors (NMOS). These can be thin film transistors (TFT), and may include polysilicon or amorphous silicon. When provided to the respective transistors' control terminals, the high voltage Vhigh turns off the fourth and fifth switching transistors Qs4 and Qs5, and the low voltage Vlow turns on the fourth and fifth switching transistors Qs4 and Qs5. In contrast, the high voltage Vhigh turns on the first, third, and sixth switching transistors Qs1, Qs3, and Qs6, and the low voltage Vlow turns off these transistors.

The organic light emitting element LD has its anode connected to the fifth and sixth switching transistors Qs5 and Qs6, and has its cathode connected to the common voltage Vss. The organic light emitting element LD displays images by emitting light of varying intensity depending on the current ILD supplied by the driving transistor Qd through the fifth switching transistor Qs5. The current ILD depends on the voltage between the control terminal and the input terminal of the driving transistor Qd. The sixth switching transistor Qs6 resets the anode voltage to the reset voltage VRST.

The reset voltage VRST resets the anode of the organic light emitting element LD and resets the voltage at the node N1. The reset voltage VRST and the driving voltage Vdd can be applied through the driving voltage lines.

Operation of the organic light emitting device of FIG. 19 will now be described in detail with reference to FIG. 20. FIG. 20 shows waveform diagrams of driving signals applied to an exemplary, n-th row of pixels.

Referring to FIG. 20, in the (n−2)-th and (n−1)-th horizontal periods, the Reset and EmD control signals are asserted, i.e. are at their respective turn-on voltages Vhigh and Vlow. The scanning signal Scan is deasserted (at the turn-off voltage Vlow) during this time (2H), and will become asserted (Vhigh) in the n-th horizontal period.

In the (n−1)-th horizontal period, the Vth control signal becomes asserted (Vhigh). The Reset control signal and the EmD control signal remain asserted (Vhigh and Vlow respectively). In the n-th horizontal period (or slightly earlier), the Reset control signal and the EmD control signal become deasserted, the Vth control signal remains asserted, and the scanning signal Scan becomes asserted (Vhigh). In the (n+1)-th horizontal period or shortly before, the Vth control signal becomes deasserted, and the scanning signal Scan remains asserted. At some time, the EmD control signal and the EmU control signal become asserted (Vlow). In FIG. 20, the EmU control signal is asserted in the (n+2)-th horizontal period, and the EmD control signal is asserted near the end of the (n+1)-th horizontal period. While the EmU and EmD control signals are asserted, the organic light emitting element LD emits light. The EmU control signal becomes deasserted (Vhigh) before the (n−2)-th horizontal period of the next frame. The duration of the EmU and EmD control signals being asserted depends on the particular embodiment.

The states of pixels PX in the n-th row in different horizontal periods will now be described.

In the (n−2)-th horizontal period, the Reset control signal and the EmD control signal are in the asserted state. The Reset control signal becomes asserted in the (n−2)-th horizontal period, and the EmD control signal stays asserted from the previous frame. The sixth switching transistor Qs6 receiving the Reset control signal is turned on, and the fifth switching transistor Qs5 remains on from the previous frame. Therefore, the sixth switching transistor Qs6 resets the anode of the organic light emitting element LD to the reset voltage VRST, and the fifth switching transistor Qs5 provides a conductive path between the nodes N3 and N5.

In the (n−1)-th horizontal period, the Reset control signal and the EmD control signal remain asserted (Vhigh and Vlow respectively), and the Vth control signal changes from the turn off voltage (Vlow) to the turn-on voltage (Vhigh). The fifth and sixth switching transistors Qs5 and Qs6 remain on, and the third switching transistor Qs3 turns on. Therefore, the node N1 is connected to the reset voltage VRST through the nodes N3 and N5, and is discharged to the reset voltage VRST. Also, the anode of the organic light emitting element LD, at the node N5, remains at the reset voltage VRST. As a result, the control terminal of the driving transistor Qd is pulled down to turn on the driving transistor Qd.

In the n-th horizontal period, the Reset control signal and the EmD control signal change to the turn-off voltage (in FIG. 20 the Reset control signal is deasserted slightly before the n-th horizontal period), and the Vth control signal remains at the turn-on voltage. The scanning signal Scan is changed from the turn-off voltage (Vlow) to the turn-on voltage (Vhigh). The fifth and sixth switching transistors Qs5 and Qs6 are turned off, the third switching transistor Qs3 remains on, and the first switching transistor Qs1 receiving the scanning signal Scan turns on to transmit the data voltage Vdata to the input terminal (node N2) of the driving transistor Qd. The data voltage Vdata is connected to the node N1 through the node N2 and the node N3, and the corresponding charge is stored in the capacitor Cst. Therefore, the node N1 charges to the sum Vdata+Vth of the data voltage Vdata input in the n-th horizontal period and the threshold voltage Vth of the driving transistor Qd. The third switching transistor Qs3 may or may not have the same threshold voltage as the driving transistor Qd.

In the (n+1)-th horizontal period, the Vth control signal is changed from the turn-on voltage (Vhigh) to the turn-off voltage (Vlow). In FIG. 20, this transition occurs near the end of the n-th horizontal period. In the (n+1)-th horizontal period, the scanning signal Scan remains asserted (Vhigh). The third switching transistor Qs3 is turned off, and the first switching transistor Qs1 remains on to apply the data voltage to the node N2. However, since the third switching transistor Qs3 between the nodes N3 and N1 is turned off, the input data voltage Vdata is disconnected from the node N1. Hence, the node N1 is maintained at the voltage level (data voltage Vdata input at the n-th horizontal period+threshold voltage Vth) established in the n-th horizontal period.

In the (n+2)-th horizontal period, the scanning signal Scan changes from the turn-on voltage (Vhigh) to the turn-off voltage (Vlow), and the EmU control signal and EmD control signal are changed to the turn-on voltages (Vlow). The fourth and fifth switching transistors Qs4 and Qs5 are turned on to provide a conductive path from the power supply voltage Vdd to the organic light emitting element LD. The current flowing to the organic light emitting element LD is determined by the charge stored at the node N1 by the capacitor Cst. Thus, in the (n+2)-th horizontal period the circuit state is as in FIG. 18. Referring to the waveforms of FIG. 20, the EmU control signal becomes asserted in the middle of the (n+2)-th horizontal period, and the EmD control signal becomes asserted before the start of the (n+2)-th horizontal period. Therefore, the fifth switching transistor Qs5 is turned on in advance.

In the present exemplary embodiment, the impulse driving is controlled by the EmU control signal since this signal controls the time of displaying black. In particular, the circuit state of FIG. 18 is maintained from the (n+3)-th horizontal period until the EmU control signal is deasserted (Vhigh). In each frame, the organic light emitting element LD emits no light to display black when the EmU control signal is deasserted, and emits light of the desired luminance when the EmU control signal is asserted. Therefore, impulse driving is provided in which the time for displaying black can be controlled through the EmU control signal. The EmU control signal will be deasserted before the (n−2)-th horizontal period of the next frame, at a time which can be set as desired for the particular embodiment.

As shown in FIG. 20, in each frame the scanning signal Scan for the n-th row is kept asserted over a time interval overlapping with the n-th and (n+1)-th horizontal periods. This interval overlaps with the time of asserting the scanning signal Scan for the (n+1)-th row, when the data voltage Vdata is at a level intended for the pixel in the (n+1)-th row. This overlap does not create a problem however because in the (n+1)-th horizontal period the data voltage Vdata is disconnected from the node N1 of the n-th row (due to the Vth control signal being deasserted in the n-th row). Extending the assertion period of the scanning signal Scan to a value of almost 2H allows simpler construction of the driving circuit by facilitating synchronization between the scanning signal Scan and other signals (the Reset, Vth, and EmD control signals).

Figure 21:
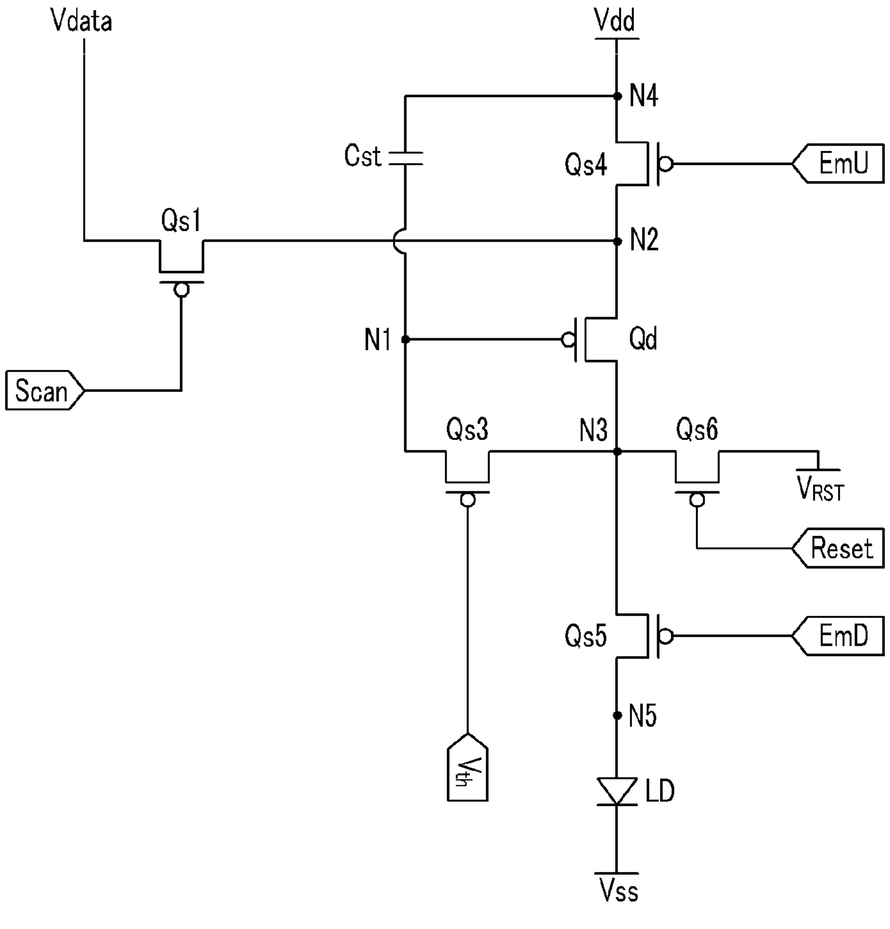
FIG. 21 shows a circuit diagram of a pixel in an organic light emitting device according to another exemplary embodiment of the present invention.
Figure 22:
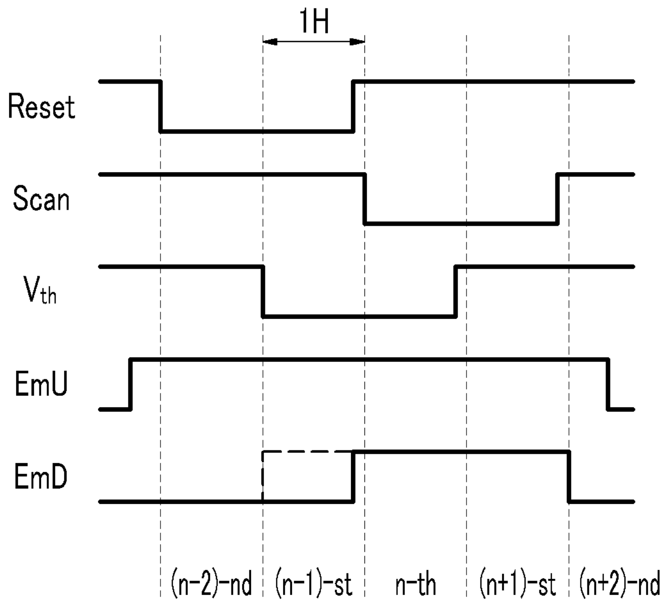
FIG. 22 shows waveform diagrams of driving signals applied to one row of pixels in an organic light emitting device of FIG. 21.

FIG. 21 and FIG. 22 illustrate another embodiment which is identical to those of FIGS. 2-20 except as shown in the figures and described below. The embodiment of FIGS. 21-22 is similar to the embodiment of FIG. 12 except for the position of the sixth switching transistor Qs6. More particularly, the sixth switching transistor Qs6 is connected to the node N3 in FIG. 21 instead of the node N5 in FIG. 12.

FIG. 21 shows a circuit diagram of a typical pixel in an organic light emitting device such as shown in FIG. 1.

As shown in FIG. 21, each pixel PX includes an organic light emitting element LD, a driving transistor Qd, a capacitor Cst, and five switching transistors Qs1, Qs3, Qs4, Qs5, and Qs6.

The driving transistor Qd has an output terminal, an input terminal, and a control terminal. The control terminal of the driving transistor Qd is connected at a node N1 to the capacitor Cst and an output terminal of the third switching transistor Qs3. The input terminal of the driving transistor Qd is connected at a node N2 to an output terminal of the first switching transistor Qs1 and an output terminal of the fourth switching transistor Qs4. The output terminal of the driving transistor Qd is connected at a node N3 to an input terminal of the third switching transistor Qs3, an input terminal of the fifth switching transistor Qs5, and an output terminal of the sixth switching transistor Qs6.

A first terminal of the capacitor Cst is connected at the node N1 to the driving transistor Qd and the third switching transistor Qs3. A second terminal of the capacitor Cst is connected at a node N4 to the driving voltage Vdd and an input terminal of the fourth switching transistor Qs4.

The switching transistors Qs1, Qs3, Qs4, Qs5, and Qs6 include the first switching transistor Qs1 for transmitting a data voltage, a third switching transistor Qs3 for compensating variations of the threshold voltage of the driving transistor Qd, the fourth switching transistor Qs4 for applying the driving voltage Vdd to the driving transistor Qd, and the fifth switching transistor Qs5 for applying the output signal of the driving transistor Qd to the organic light emitting element LD. The sixth switching transistor Qs6 cooperates with the third switching transistor Qs3 to reset the voltage at the node N1, and cooperates with the fifth switching transistor Qs5 to reset the anode voltage of the organic light emitting element LD.

The first switching transistor Qs1 transmits the data voltage Vdata to the input terminal of the driving transistor Qd in response to the scanning signal Scan. The third switching transistor Qs3 provides a conductive path between the nodes N1 and N3 in response to the control signal Vth, and thus connects the voltage of the node N3 to the node N1. The fourth switching transistor Qs4 transmits the driving voltage Vdd to the driving transistor Qd in response to a control signal EmU, and the fifth switching transistor Qs5 transmits the output current of the driving transistor Qd to the organic light emitting element LD in response to a control signal EmD. The sixth switching transistor Qs6 connects the node N3 to the reset voltage VRST in response to the control signal Reset. Thus, the sixth switching transistor Qs6 connects the node N1 to the reset voltage VRST when the third switching transistor Qs3 is on, and resets the anode of the organic light emitting element LD to the reset voltage VRST when the fifth switching transistor Qs5 is on.

In the present exemplary embodiment, the switching transistors Qs1, Qs3, Qs4, Qs5, and Qs6 and the driving transistor Qd are p-channel electric field effect transistors (PMOS). These can be thin film transistors (TFT), and may include polysilicon or amorphous silicon. When provided to the respective transistors' control terminals, the high voltage Vhigh turns off the switching transistors Qs1, Qs3, Qs4, Qs5, and Qs6, and the low voltage Vlow turns them on.

The organic light emitting element LD has its anode connected to the fifth switching transistor Qs5, and has its cathode connected to the common voltage Vss. The organic light emitting element LD displays images by emitting light of varying intensity depending on the current ILD supplied by the driving transistor Qd through the fifth switching transistor Qs5. The current ILD depends on the voltage between the control terminal and the input terminal of the driving transistor Qd.

The reset voltage VRST resets the anode of the organic light emitting element LD and resets the voltage at the node N1. The reset voltage VRST and the driving voltage Vdd can be applied through the driving voltage lines.

Operation of the organic light emitting device of FIG. 21 will now be described in detail with reference to FIG. 22.

FIG. 22 shows waveform diagrams of driving signals applied to an exemplary, n-th row of pixels.

Referring to FIG. 22, in the (n−2)-th and (n−1)-th horizontal periods, the reset control signal and the EmD control signal are asserted (Vlow). The scanning signal Scan is deasserted during this time (2H), and will become asserted (Vlow) in the n-th horizontal period.

In the (n−1)-th horizontal period, the Vth control signal is also asserted (Vlow) together with the Reset and EmD control signals. In the n-th horizontal period, the Reset and EmD control signals are deasserted (the Reset control signal is deasserted near the end of the (n−1)-th horizontal period), the Vth control signal remains asserted (until at least near the end of the n-th horizontal period), and the scanning signal Scan is asserted. In the (n+1)-th horizontal period or slightly early, the Vth control signal becomes deasserted (Vhigh). In the (n+1)-th horizontal period the scanning signal Scan remains asserted. At some time, the EmD and EmU control signals become asserted (Vlow). In the embodiment of FIG. 22, they become asserted in the (n+2)-th horizontal period. While the EmU and EmD control signals are asserted, the organic light emitting element LD emits light. The EmU control signal becomes deasserted before the (n−2)-th horizontal period of the next frame. The time when the EmU and EmD control signals are deasserted may be set in different ways as desired for the particular embodiment.

The states of pixels PX in the n-th row in different horizontal periods will now be described.

In the (n−2)-th horizontal period, the Reset and EmD control signals are in their asserted states. The Reset control signal becomes asserted in the (n−2)-th horizontal period, and the EmD control signal stays asserted from the previous frame. The sixth switching transistor Qs6 receiving the Reset control signal is turned on, and the fifth switching transistor Qs5 remains on from the previous frame and provides a conductive path between the nodes N3 and N5. In its conductive state, the sixth switching transistor Qs6 charges the node N3 to the reset voltage VRST. As a result, the anode of the organic light emitting element LD is charged to the reset voltage VRST.

In the (n−1)-th horizontal period, the Reset control signal and the EmD control signal remain asserted, and the Vth control signal transitions from the turn-off voltage (Vhigh) to the turn-on voltage (Vlow). The fifth and sixth switching transistors Qs5 and Qs6 remain on, and the third switching transistor Qs3 is turned on. Therefore, the node N1 is connected to the reset voltage VRST through the node N3, and the voltage at the node N1 becomes equal to the reset voltage VRST. Also, the anode of the organic light emitting element LD stays at the reset voltage VRST as in the (n−2)-th horizontal period. As a result, the control terminal of the driving transistor Qd is pulled down to turn on the driving transistor Qd.

In the n-th horizontal period (or slightly earlier at least for the Reset control signal), the Reset and EmD control signals become deasserted, and the Vth control signal remains asserted. The scanning signal Scan becomes asserted (Vlow). The fifth and sixth switching transistors Qs5 and Qs6 are turned off, the third switching transistor Qs3 remains on, and the first switching transistor Qs1 receiving the scanning signal Scan is turned on to transmit the data voltage Vdata to the input terminal (node N2) of the driving transistor Qd. The data voltage Vdata is connected to the node N1 through the node N2 and the node N3, and the corresponding charge is stored in the capacitor Cst. As a result, the node N1 charges to the sum Vdata+Vth of the data voltage Vdata input in the n-th horizontal period and the threshold voltage Vth of the driving transistor Qd. The third switching transistor Qs3 may have the same threshold voltage.

In the (n+1)-th horizontal period (or slightly earlier), the Vth control signal is changed from the turn-on voltage (Vlow) to the turn-off voltage (Vhigh), and the scanning signal Scan remains at the turn-on voltage (Vlow). The third switching transistor Qs3 is turned off, and the first switching transistor Qs1 remains on to keep applying the data voltage to the node N2. However, since the third switching transistor Qs3 between the nodes N3 and N1 is turned off, the input data voltage Vdata is disconnected from the node N1. Hence, the node N1 is maintained at the voltage level (data voltage Vdata input at the n-th horizontal period+threshold voltage Vth) provided in the n-th horizontal period.

In the (n+2)-th horizontal period, or slightly earlier, the scanning signal Scan becomes deasserted (Vhigh). In the (n+2)-th horizontal period, the EmU control signal and EmD control signal become asserted (Vlow). The fourth and fifth switching transistors Qs4 and Qs5 are turned on to provide a conductive path from the power supply voltage Vdd to the organic light emitting element LD. The current flowing to the organic light emitting element LD depends on the charge at the node N1 stored in the capacitor Cst. Therefore, in the (n+2)-th horizontal period, the circuit state is as in FIG. 18. Referring to the waveforms of FIG. 22, the EmU control signal becomes asserted in the middle of the (n+2)-th horizontal period, and the EmD control signal becomes asserted at the beginning of the (n+2)-th horizontal period. Therefore, the fifth switching transistor Qs5 turns on in advance.

Further, the EmD control signal may have an alternate waveform in the (n−1)-th horizontal period as shown by a dashed line in FIG. 22, i.e. the EmD control signal may be deasserted at the beginning of the (n−1)-th horizontal period or at any other time during the (n−1)-th horizontal period. The solid line waveform has the benefit of keeping the EmD signal asserted for the time of about 2H per frame, and this waveform allows simple implementation of the driving circuit due to some other control signals being asserted for the same time (2H). However, both the solid-line waveform and the dashed-line waveform are acceptable.

In the present exemplary embodiment, the impulse driving is controlled by the EmU control signal. In particular, the circuit state of FIG. 18 is maintained from the (n+3)-th horizontal period until the EmU control signal is deasserted. In each frame, the organic light emitting element LD emits no light to display black when the EmU control signal is deasserted, and emits light of the desired luminance when the EmU control signal is asserted. Therefore, impulse driving is provided in which the time for displaying black is controlled through the EmU control signal. The EmU control signal will be deasserted before the (n−2)-th horizontal period of the next frame, at a time which can be set as desired for the particular embodiment.

As shown in FIG. 22, in each frame the scanning signal Scan for the n-th row is kept asserted over a time interval overlapping with the n-th and (n+1)-th horizontal periods. This interval overlaps with the time of asserting the scanning signal Scan for the (n+1)-th row, when the data voltage Vdata is at a level intended for the pixel in the (n+1)-th row. This overlap does not create a problem however because in the (n+1)-th horizontal period the data voltage Vdata is disconnected from the node N1 of the n-th row (due to the Vth control signal being deasserted in the n-th row). Extending the assertion period of the scanning signal Scan to a value of almost 2H allows simpler construction of the driving circuit by facilitating synchronization between the scanning signal Scan and other signals (the Reset, Vth, and EmD control signals).

Figure 23:
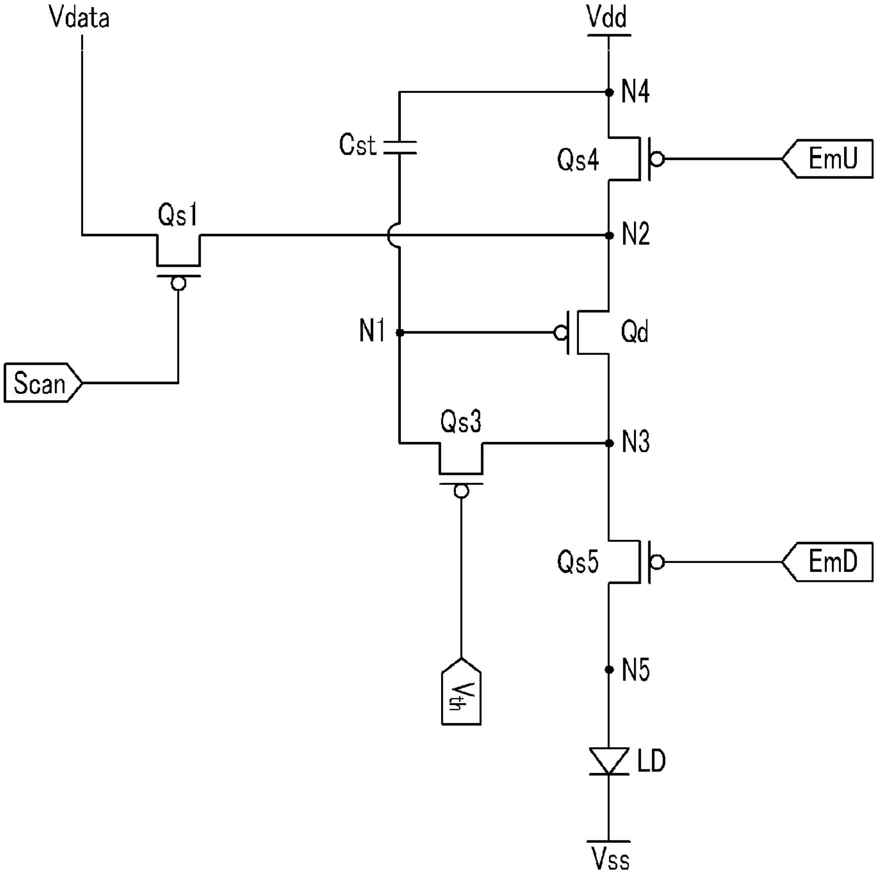
FIG. 23 shows a circuit diagram of a pixel of an organic light emitting device according to another exemplary embodiment of the present invention.

An exemplary embodiment using four switching transistors and a driving transistor is illustrated in FIG. 23. This embodiment is identical to the embodiments of FIGS. 2-22 except as illustrated in the figures and described below.

FIG. 23 shows a circuit diagram of a typical pixel in an organic light emitting device such as shown in FIG. 1. The embodiment of FIG. 23 omits the second and sixth switching transistors Qs2 and Qs6 and the capacitor Ckb of the embodiment of FIG. 2, and omits the sixth switching transistor Qs6 of FIG. 12.

As shown in FIG. 23, the pixel PX includes an organic light emitting element LD, a driving transistor Qd, a capacitors Cst, and four switching transistors Qs1, Qs3, Qs4, and Qs5.

The driving transistor Qd has an output terminal, an input terminal, and a control terminal. The control terminal of the driving transistor Qd is connected at a node N1 to the capacitor Cst and to an output terminal of the third switching transistor Qs3. The input terminal of the driving transistor Qd is connected at a node N2 to an output terminal of the first switching transistor Qs1 and an output terminal of the fourth switching transistor Qs4. The output terminal of the driving transistor Qd is connected at a node N3 to an input terminal of the third switching transistor Qs3 and an input terminal of the fifth switching transistor Qs5.

A first terminal of the capacitor Cst is connected at the node N1 to the driving transistor Qd and the third switching transistor Qs3. A second terminal of the capacitor Cst is connected at a node N4 to the driving voltage Vdd and an input terminal of the fourth switching transistor Qs4.

The switching transistors Qs1, Qs3, Qs4, and Qs5 include a first switching transistor Qs1 for transmitting a data voltage, a third switching transistor Qs3 for controlling the voltage at the control terminal of the driving transistor Qd to compensate for variations of the threshold voltage of the driving transistor Qd, a fourth switching transistor Qs4 for applying the driving voltage Vdd to the driving transistor Qd, and a fifth switching transistor Qs5 for applying the output signal of the driving transistor Qd to the organic light emitting element LD. In this embodiment, the third and fifth switching transistors Qs3 and Qs5 reset the voltage at the node N1.

The first switching transistor Qs1 transmits the data voltage Vdata to the input terminal of the driving transistor Qd in response to a scanning signal Scan. The third switching transistor Qs3 provides a conductive path between the nodes N1 and N3 in response to the control signal Vth, and transmits the voltage at the node N3 to the node N1. The fourth switching transistor Qs4 transmits the driving voltage Vdd to the driving transistor Qd in response to a control signal EmU. The fifth switching transistor Qs5 transmits the output current of the driving transistor Qd to the organic light emitting element LD in response to a control signal EmD. In addition, the third and fifth switching transistors Qs3 and Qs5 are turned on to connect the voltage at the node N1 to the common voltage Vss through the organic light emitting element LD and to thus reset the node N1.

In the present exemplary embodiment, the switching transistors Qs1, Qs3, Qs4, and Qs5 and the driving transistor Qd are p-channel electric field effect transistors (PMOS). These can be thin film transistors (TFT), and may include polysilicon or amorphous silicon. When provided to the respective transistors' control terminals, the high voltage Vhigh turns off the switching transistors Qs1, Qs3, Qs4, and Qs5, and the low voltage Vlow turns on the switching transistors Qs1, Qs3, Qs4, and Qs5.

The organic light emitting element LD has an anode connected to the fifth switching transistor Qs5, and has a cathode connected to the common voltage Vss. The organic light emitting element LD displays images by emitting light of varying intensity depending on the current ILD supplied by the driving transistor Qd through the fifth switching transistor Qs5. The current ILD depends on the voltage between the control terminal and the input terminal of the driving transistor Qd. The anode of the organic light emitting element LD is reset when the node N1 is reset.

The driving voltage Vdd can be applied through the driving voltage line.

Operation of the organic light emitting device of FIG. 23 will be described in detail with reference to FIG. 24 to FIG. 28.

Figure 24:
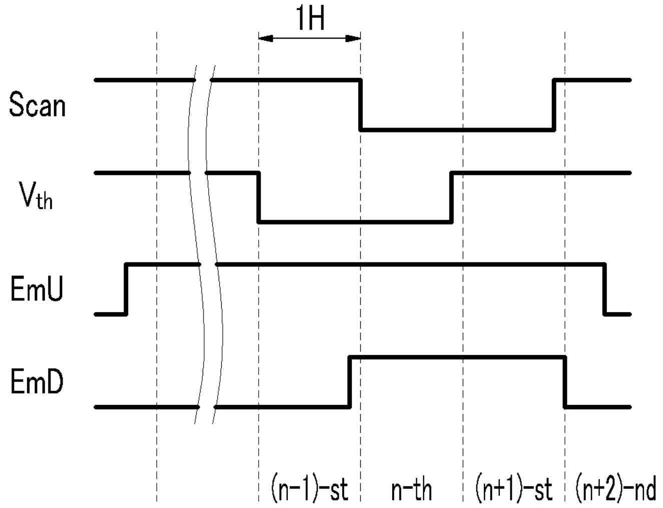
FIG. 24 shows waveform diagrams of driving signals applied to one row of pixels in an organic light emitting device of FIG. 23.

FIG. 24 shows waveform diagrams of driving signals applied to an exemplary, n-th row of pixels. FIG. 25 to FIG. 28 show equivalent circuit diagrams of a pixel in the n-th row in different horizontal periods.

Referring to FIG. 24, in the (n−1)-th horizontal period, the Vth control signal and the EmD control signal are asserted. The scanning signal Scan becomes asserted in the n-th horizontal period for the time 1H. In the n-th horizontal period or slightly before, the EmD control signal becomes deasserted, and the Vth control signal remains asserted. The scanning signal Scan is asserted. In the (n+1)-th horizontal period or slightly before, the Vth control signal becomes deasserted. The scanning signal Scan remains asserted until the end of the (n+1)-th horizontal period. The EmD control signal and the EmU control signal become asserted some time later, beginning in the (n+2)-th horizontal period in the present exemplary embodiment. While the EmU and EmD control signals are asserted, the organic light emitting element LD emits light. The EmU control signal can become deasserted before the (n−1)-th horizontal period of the next frame, possibly well in advance of the (n−1)-th horizontal period as in FIG. 24. The time of deasserting the EmU and EmD control signals may be set in different ways as desired for the particular embodiment. Since the transistors are p-channel electric field effect transistors in the exemplary embodiment of FIG. 23, the turn-on voltage is the low voltage and the turn-off voltage is the high voltage.

The states of pixels in the n-th row in different horizontal periods will now be described.

Figure 25:
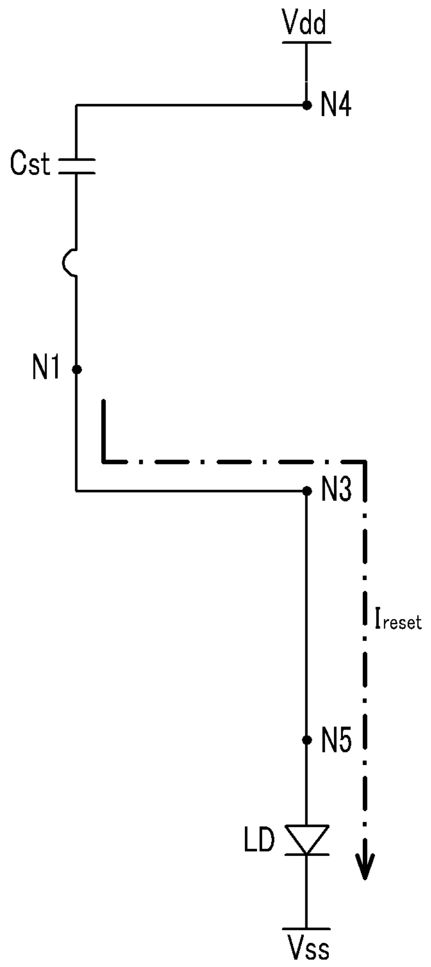
FIG. 25 to FIG. 28 show equivalent circuit diagrams of a pixel shown in FIG. 23 in different horizontal periods.

In the (n−1)-th horizontal period, the Vth control signal and the EmD control signal are asserted. The Vth control signal becomes asserted in the (n−1)-th horizontal period, and the EmD control signal remains asserted from the previous frame. The third switching transistor Qs3 receiving the Vth control signal is turned on, and the fifth switching transistor Qs5 remains on from the previous frame. Therefore, the third switching transistor Qs3 is turned on to provide a conductive path between the nodes N1 and N3, and the fifth switching transistor Qs5 maintains the turn on-state so that the nodes N3 and N5 are interconnected. As a result, the circuit state of FIG. 25 is obtained. Therefore, the node N1 is discharged to the common voltage Vss through the node N3, the node N5, and the organic light emitting element LD, and is thus reset. Hence, the voltage at the node N1 is reduced to turn on the driving transistor Qd.

Figure 26:
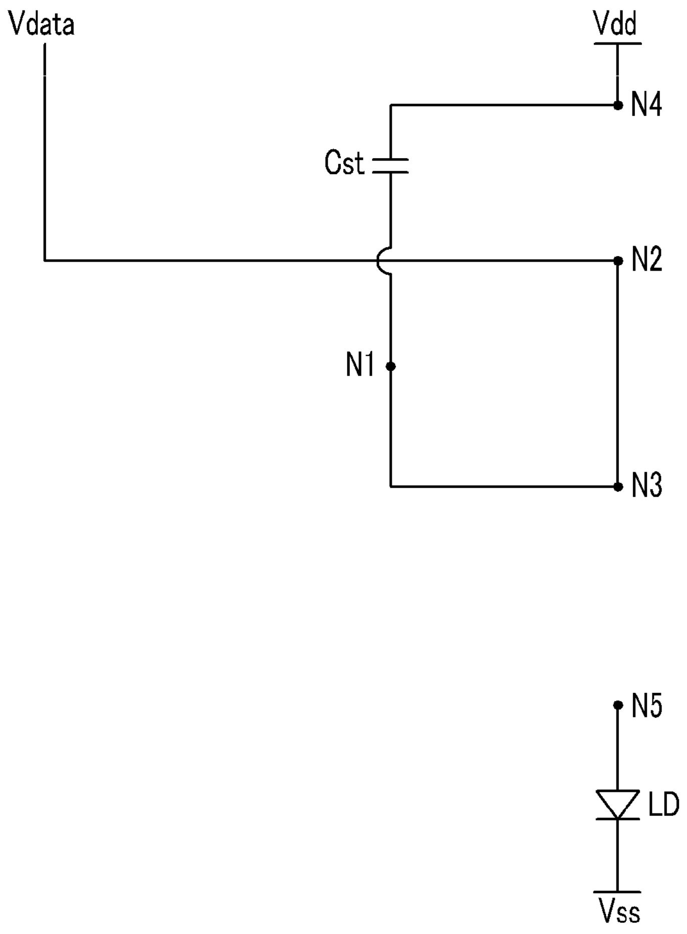

In the n-th horizontal period or slightly before, the EmD control signal is changed from the turn-on voltage to the turn-off voltage, and the Vth control signal maintains the turn-on voltage until near the end of the n-th horizontal period. The scanning signal Scan is changed from the turn-off voltage to the turn-on voltage. The fifth switching transistor Qs5 is turned off, the third switching transistor Qs3 remains on, and the first switching transistor Qs1 receiving the scanning signal Scan is turned on to transmit the data voltage Vdata to the input terminal (node N2) of the driving transistor Qd. The driving transistor Qd remains on since the (n−1)-th horizontal period, so the data voltage Vdata is connected to the node N1 through the nodes N2 and N3 and the corresponding charge is stored in the capacitor Cst. In this process, the node N1 is charged to the sum Vdata+Vth of the data voltage Vdata input in the n-th horizontal period and the threshold voltage Vth of the driving transistor Qd. The third switching transistor Qs3 may or may not have the same threshold voltage. Accordingly, the circuit state shown in FIG. 26 is obtained in the n-th horizontal period.

Figure 27:
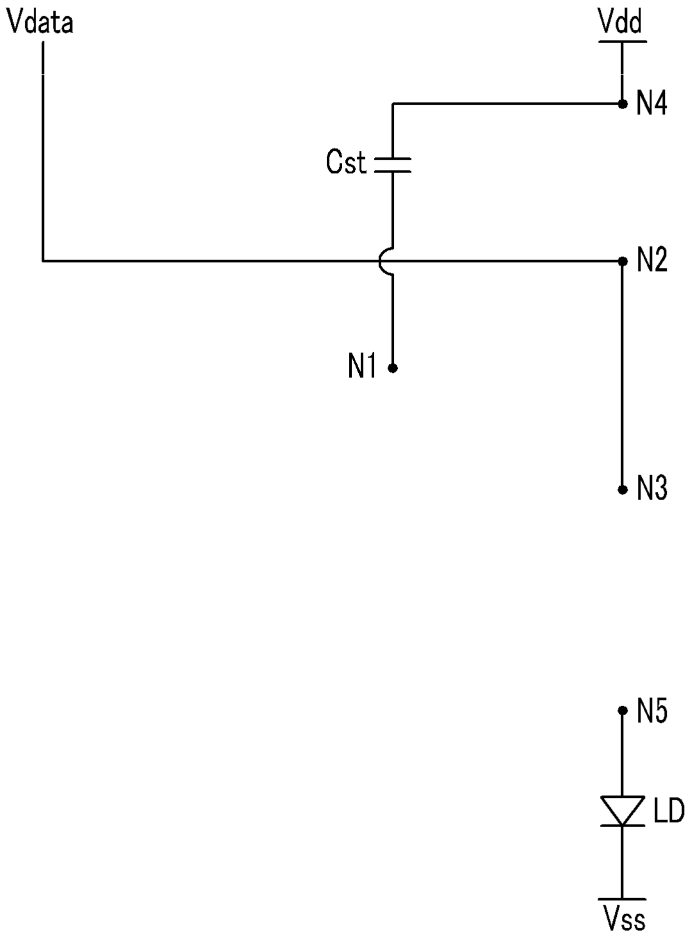

In the (n+1)-th horizontal period or slightly before, the Vth control signal is changed from the turn-on voltage to the turn-off voltage. The scanning signal Scan maintains the turn-on voltage. The third switching transistor Qs3 is turned off, and the first switching transistor Qs1 maintains the turn-on state to apply the data voltage to the node N2. However, since the third switching transistor Qs3 between the nodes N3 and N1 is turned off, the input data voltage Vdata is disconnected from the node N1. Hence, the node N1 is maintained at the voltage level (data voltage Vdata input at the n-th horizontal period+threshold voltage Vth) obtained in the n-th horizontal period. The circuit state in the (n+1)-th horizontal period is shown in FIG. 27.

Figure 28:
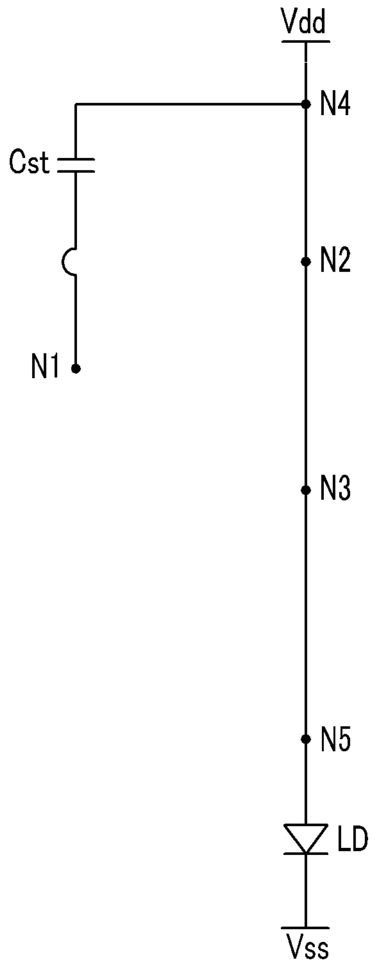

In the (n+2)-th horizontal period, the scanning signal Scan is changed from the turn-on voltage to the turn-off voltage, and the EmU control signal and the EmD control signal are asserted. The fourth and fifth switching transistors Qs4 and Qs5 are turned on to provide a conductive path from the power voltage Vdd to the organic light emitting element LD. The current flowing to the organic light emitting element LD depends on the charge stored in the capacitor Cst. The circuit state in the (n+2)-th horizontal period is shown in FIG. 28. Referring to the waveforms of FIG. 24, the EmU control signal is asserted later than the EmD control signal. Therefore, the fifth switching transistor Qs5 turns on in advance.

The impulse driving is controlled by the EmU control signal. In particular, the circuit state of FIG. 28 is maintained from the (n+2)-th horizontal period until the EmU control signal is deasserted. In each frame, the organic light emitting element LD emits no light to display black when the EmU control signal is deasserted, and emits light of the desired luminance when the EmU control signal is asserted. Therefore, impulse driving is provided in which the time for displaying black can be controlled through the EmU control signal. The EmU control signal will be deasserted before the (n−1)-th horizontal period of the next frame. This time can be set differently for different embodiments and is not shown in FIG. 24.

As shown in FIG. 24, in each frame the scanning signal Scan for the n-th row is kept asserted over a time interval overlapping with the n-th and (N+1)-th horizontal periods. This interval overlaps with the time of asserting the scanning signal Scan for the (n+1)-th row, when the data voltage Vdata is at a level intended for the pixel in the (N+1)-th row. This overlap does not create a problem however because in the (n_1)-th horizontal period the data voltage is disconnected from the node N1 of the n-th row (due to the Vth control signal being deasserted in the n-th row). Extending the asserting period of the scanning signal Scan to a value of about 2H allows simpler construction of the driving circuit by facilitating synchronization between the scanning signal Scan and other signals (the Vth and EmD control signals).

The embodiments described above illustrate but do not limit the invention. Other embodiments and variations are within the scope of the invention, as described by the appended claims.

What is claimed is:

1. A method for driving a display device including an organic light emitting element and a driving transistor, the method comprising:

resetting a voltage at a control terminal of the driving transistor;

resetting a voltage at an anode of the organic light emitting element by supplying a reset voltage to the anode of the organic light emitting element;

supplying a data voltage to an input terminal of the driving transistor to charge a storage capacitor to a first voltage depending on the data voltage; and driving the organic light emitting element to emit light corresponding to the first voltage at the storage capacitor.

2. The method of claim 1, further comprising displaying black by the organic light emitting element irrespective of the data voltage.

3. The method of claim 1, wherein the display device further includes a switching transistor for providing a data voltage to the input terminal of the driving transistor in response to a scanning signal, a driving voltage transistor connected between a driving voltage terminal and the input terminal of the driving transistor, a light-emitting device transistor connected between the anode of the organic light emitting element and an output terminal of the driving transistor, and a compensation transistor connected between the output and control terminals of the driving transistor, and the resetting of the voltage at the control terminal and the resetting of the voltage at the anode of the organic light emitting element are performed simultaneously.

4. The method of claim 3, wherein the resetting of the voltage at the control terminal and the resetting of the voltage at the anode of the organic light emitting element are performed by turning on the compensation transistor and the light-emitting device transistor.

5. The method of claim 3, wherein the supplying of the data voltage to the control terminal of the driving transistor is performed by turning on the switching transistor and the compensation transistor when the control terminal is reset.

6. The method of claim 3, wherein the driving the organic light emitting element is performed by turning on the driving voltage transistor and the light-emitting device transistor.

7. The method of claim 3, wherein the switching transistor and the compensation transistor are turned on for about two horizontal periods in each frame.

8. The method of claim 7, wherein the light-emitting device transistor is turned off for about two horizontal periods in each frame.

9. The method of claim 1, wherein the display device further includes a switching transistor for providing the data voltage to the input terminal of the driving transistor in response to a scanning signal, a driving voltage transistor connected between a driving voltage terminal and the input terminal of the driving transistor, a light-emitting device transistor connected between the anode of the organic light emitting element and an output terminal of the driving transistor, a compensation transistor connected between the output and control terminals of the driving transistor, and a reset transistor for resetting the voltage at the anode of the organic light emitting element, and the resetting of the voltage at the anode of the organic light emitting element is performed by turning on the reset transistor.

10. The method of claim 9, wherein the resetting of the control terminal is performed by turning on the compensation transistor, the reset transistor, and the light-emitting device transistor.

11. The method of claim 9, wherein the supplying of the data voltage to the control terminal of the driving transistor is performed by turning on the switching transistor and the compensation transistor when the control terminal is reset.

12. The method of claim 9, wherein the driving the organic light emitting element is performed by turning on the driving voltage transistor and the light-emitting device transistor.

13. The method of claim 9, wherein the switching transistor, the compensation transistor, and the reset transistor are turned on for about two horizontal periods in each frame.

14. The method of claim 13, wherein the light-emitting device transistor is turned off for about two horizontal periods in each frame.

15. The method of claim 1, wherein the display device further includes a switching transistor for providing the data voltage to the input terminal of the driving transistor in response to a scanning signal, a driving voltage transistor connected between the driving voltage terminal and the input terminal of the driving transistor, a light-emitting device transistor connected between the anode of the organic light emitting element and an output terminal of the driving transistor, a compensation transistor connected between the output and control terminals of the driving transistor, a first reset transistor for resetting the voltage at the anode of the organic light emitting element, and a second reset transistor connected to the control terminal of the driving transistor, and the resetting of the voltage at the anode of the organic light emitting element is performed by turning on the first reset transistor.

16. The method of claim 15, wherein the resetting of the control terminal is performed by turning on the second reset transistor.

17. The method of claim 16, wherein the resetting of the voltage at the anode of the organic light emitting element and the resetting of the control terminal are performed simultaneously.

18. The method of claim 15, wherein the supplying of the data voltage to the control terminal of the driving transistor is performed by turning on the switching transistor and the compensation transistor when the control terminal is reset.

19. The method of claim 15, wherein the driving the organic light emitting element is performed by turning on the driving voltage transistor and the light-emitting device transistor.

* * * * *